(12) United States Patent
Sugihara

(10) Patent No.: US 12,470,123 B2
(45) Date of Patent: Nov. 11, 2025

(54) CONTROL APPARATUS FOR INVERTER

(71) Applicant: DENSO CORPORATION, Kariya (JP)

(72) Inventor: Yusuke Sugihara, Kariya (JP)

(73) Assignee: DENSO CORPORATION, Kariya (JP)

( * ) Notice: Subject to any disclaimer, the term of this patent is extended or adjusted under 35 U.S.C. 154(b) by 198 days.

(21) Appl. No.: 18/367,507

(22) Filed: Sep. 13, 2023

(65) Prior Publication Data

US 2023/0421045 A1   Dec. 28, 2023

Related U.S. Application Data

(63) Continuation of application No. PCT/JP2022/008838, filed on Mar. 2, 2022.

(30) Foreign Application Priority Data

Mar. 24, 2021 (JP) .................... 2021-050701

(51) Int. Cl.
*H02M 1/08* (2006.01)
*H02M 7/48* (2007.01)

(52) U.S. Cl.
CPC .............. *H02M 1/08* (2013.01); *H02M 7/48* (2013.01)

(58) Field of Classification Search
CPC ........... H02M 1/08; H02M 7/48; H02M 7/497
See application file for complete search history.

(56) References Cited

U.S. PATENT DOCUMENTS

| 10,897,251 B1* | 1/2021 | Ionascu ................... H02M 1/08 |
| 2012/0063187 A1* | 3/2012 | Sato ..................... H02M 3/3374 |
| | | 363/131 |
| 2014/0092653 A1* | 4/2014 | Suzuki ............... H03K 17/7955 |
| | | 363/124 |
| 2017/0179849 A1* | 6/2017 | Yokoi ..................... H02M 7/53 |
| 2019/0020263 A1 | 1/2019 | Hiranuma et al. |

* cited by examiner

*Primary Examiner* — Alex Torres-Rivera
(74) *Attorney, Agent, or Firm* — Oliff PLC

(57) ABSTRACT

In a control apparatus, a transfer unit is installed in both low- and high-voltage regions while straddling a boundary between the low- and high-voltage regions. The transfer unit transfers a switching control signal outputted from a control signal generator to the high-voltage region. A controller installed in the high-voltage region performs, based on the control signal, switching control of each of the upper- and lower-arm switches. A distinct-signal generator installed in the low-voltage region generates a distinct signal distinct from the control signal as long as no power-supply anomaly from the power storage unit has occurred, and outputs the distinct signal to the transfer unit. An anomaly determiner is provided in the high-voltage region, and the distinct signal is inputtable to the anomaly determiner through the transfer unit. The anomaly determiner determines whether the power-supply anomaly has occurred based on information on the distinct signal.

7 Claims, 13 Drawing Sheets

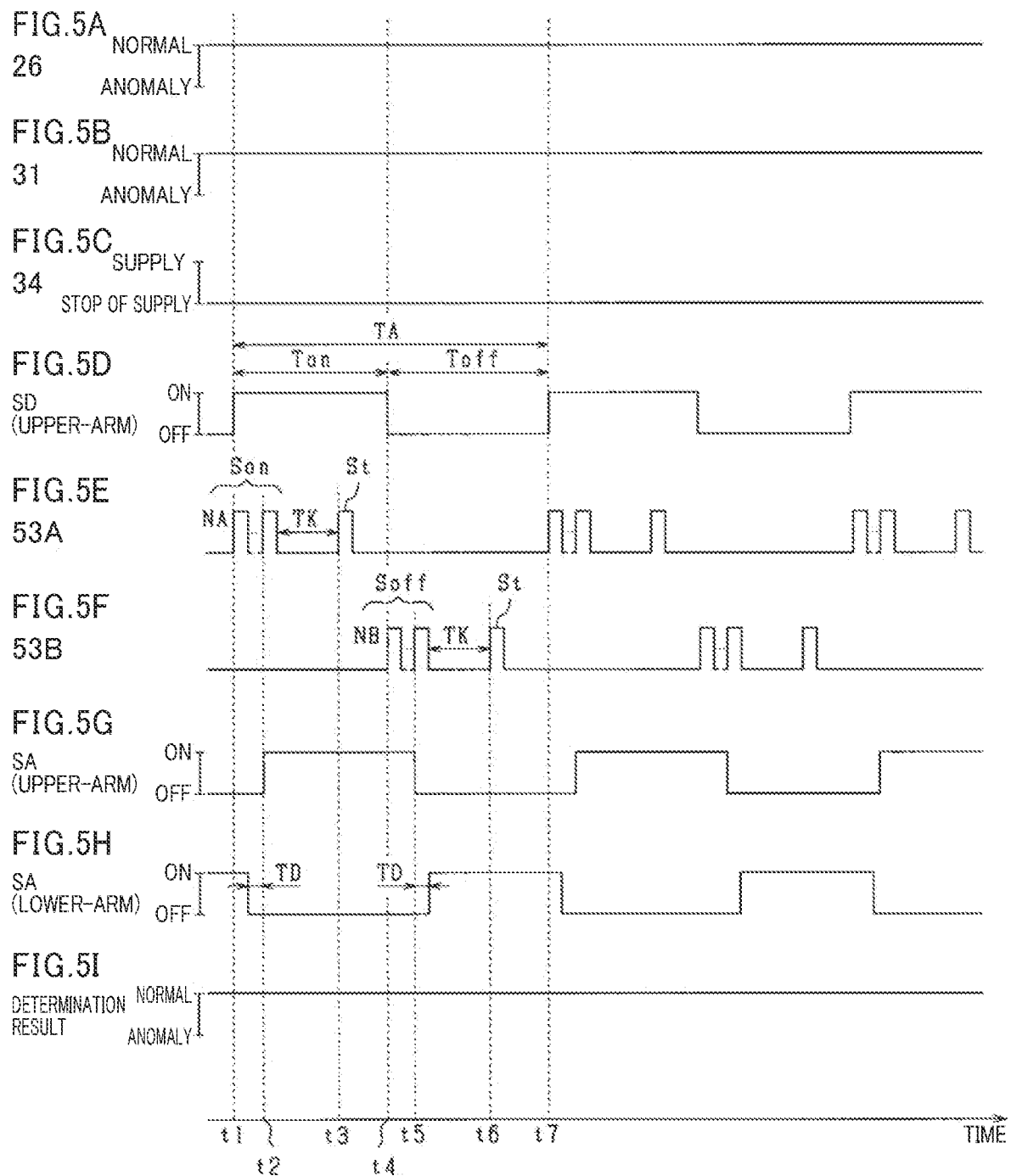

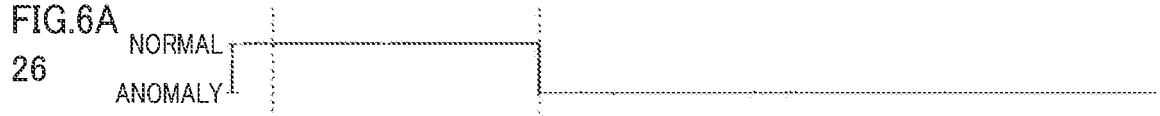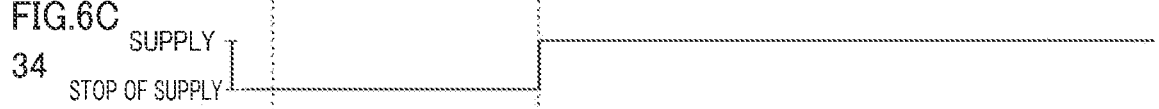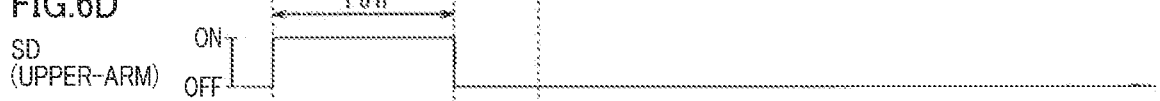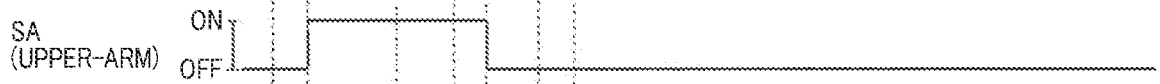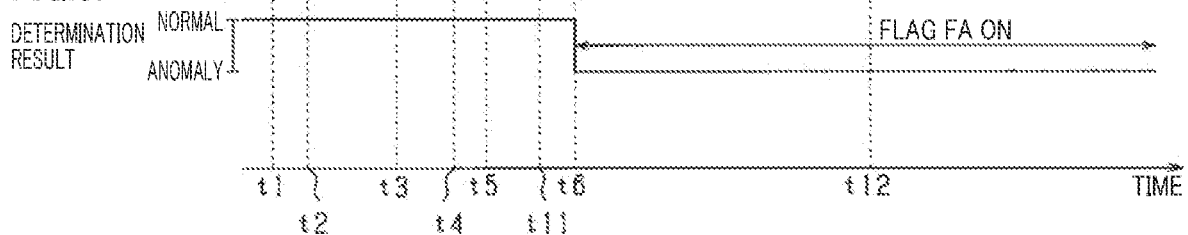

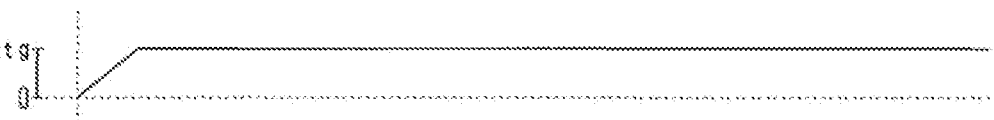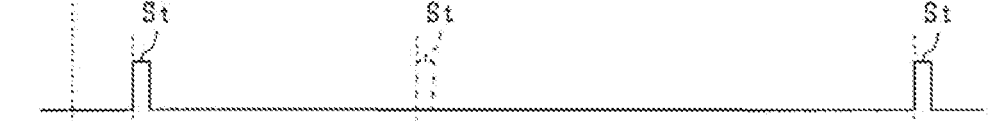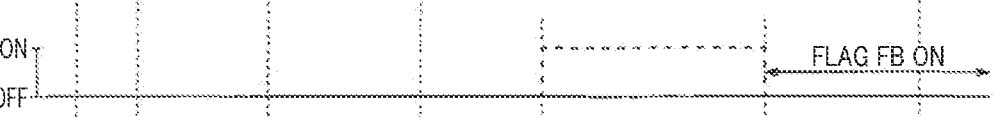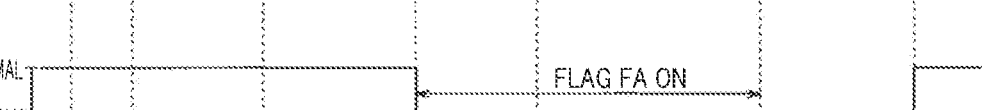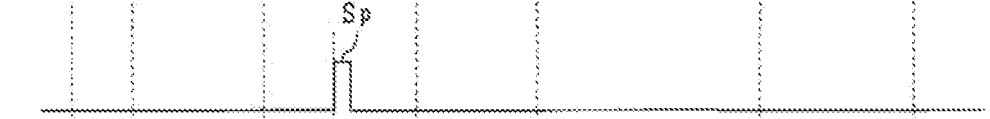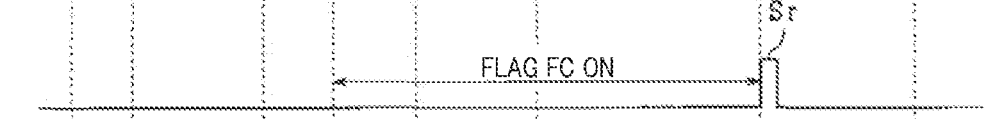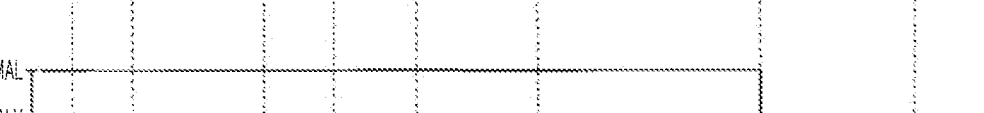

CONTROL APPARATUS FOR INVERTER

CROSS REFERENCE TO RELATED APPLICATION

The present application is a bypass continuation application of currently pending international application No. PCT/JP2022/008838 filed on Mar. 2, 2022 designating the United States of America, the entire disclosure of which is incorporated herein by reference, the internal application being based on and claiming the benefit of priority from Japanese Patent Application No. 2021-050701 filed on Mar. 24, 2021, the disclosure of which is incorporated in its entirety herein by reference.

TECHNICAL FIELD

The present disclosure relates to control apparatuses for controlling an inverter that includes a pair of upper- and lower-arm switches.

BACKGROUND

One of such conventional control apparatuses operates based on power supplied from a power storage to perform a short-circuit control task that turns on one of the upper- and lower-arm switches of each phase of an inverter while turns off the other of the upper- and lower-arm switches of the corresponding phase. The controller is required to perform the short-circuit control task reliably even for the occurrence of an anomaly in the power storage.

For addressing such a requirement, WO publication No. 2017-130668 discloses a control apparatus includes a capacitor that stores charge for turning on one of the upper- and lower-arm switches of each phase. The control apparatus additionally includes a driver and a controller. The driver outputs, to the controller, an anomaly signal indicative of the occurrence of an anomaly in a power storage when determining that an output voltage of the power storage is lower than a threshold voltage. The controller is configured to output, to the driver through a first transfer means, PWM signals to accordingly perform, through the driver, switching control of the upper- and lower-arm switches.

Specifically, the driver outputs, to the controller, the anomaly signal indicative of the occurrence of an anomaly in the power storage through a second transfer means that is different from the first transfer means. In response to receiving the anomaly signal, the controller turns on one of the upper- and lower-arm switches of each phase based on the charge stored in the capacitor, thus performing the short-circuit control task.

The above configuration of the control apparatus disclosed in the WO publication makes it possible to perform the short-circuit control task reliably even for the occurrence of an anomaly in the power storage.

SUMMARY

The control apparatus disclosed in the WO publication requires the second transfer means dedicated for transfer of the anomaly signal, which represents the occurrence of an anomaly in the power storage, from the driver to the controller, resulting in the configuration of the control apparatus becoming complicated.

From the above viewpoint, the present disclosure seems to provide control apparatuses for an inverter, each of which is capable of determining whether there is a power-supply anomaly in a power storage while maintaining a simpler configuration thereof.

An exemplary aspect of the present disclosure provides a control apparatus applicable to a system in which an inverter including a pair of an upper-arm switch and a lower-arm switch and a power storage unit installed in a low-voltage region are provided.

The control apparatus includes a control signal generator provided in the low-voltage region and configured to generate a control signal for switching control of each of the upper- and lower-arm switches, and output the control signal.

The control apparatus includes a transfer unit installed in both the low-voltage region and a high-voltage region while straddling a boundary between the low- and high-voltage regions. The transfer unit is configured to transfer the control signal outputted from the control signal generator to the high-voltage region. The high-voltage region is electrically isolated from the low-voltage region.

The control apparatus includes a controller installed in the high-voltage region and configured to perform, based on the control signal, switching control of each of the upper- and lower-arm switches.

The control apparatus includes a distinct-signal generator installed in the low-voltage region and configured to generate a distinct signal that is distinct from the control signal as long as no power-supply anomaly from the power storage unit has occurred, and output the distinct signal to the transfer unit.

The control apparatus includes an anomaly determiner provided in the high-voltage region and configured such that the distinct signal is inputtable thereto through the transfer unit. The anomaly determiner is configured to determine whether the power-supply anomaly has occurred in accordance with information on the distinct signal.

There may be an anomaly, resulting in power supply being disabled from the power storage unit. At that time, the control apparatus is required to have a function of transferring, to the controller, information indicative of the occurrence of the anomaly in order to perform switching of the drive status of each of the upper- and lower-arm switches, which constitute the inverter. An additional transfer means dedicated for transfer of the occurrence of the anomaly to the controller may be provided in the control apparatus. This however may result in the configuration of the control apparatus becoming complicated.

From this viewpoint, the control apparatus of the exemplary aspect is configured such that the transfer unit, which transfers the control signal from the control signal generator to the controller, additionally serves to transfer, to the controller, information representing that no power supply anomaly from the power storage unit has occurred.

Specifically, the control apparatus is configured to output, from the low-voltage region, the distinct signal, which is distinct from the control signal, to the transfer unit as long as no power supply anomaly from the power storage unit has occurred. The control apparatus is also configured to determine, in the high-voltage region, whether an anomaly has occurred in the low-voltage region in accordance with information on the distinct signal.

This configuration enables the transfer unit, which transfers the control signal, to additionally serve to transfer information indicative of whether an anomaly has occurred in the low-voltage region, making it possible for the control apparatus to reliably determine, in the high-voltage region, whether an anomaly has occurred in the low-voltage region while preventing the configuration of the control apparatus from becoming complicated.

BRIEF DESCRIPTION OF THE DRAWINGS

Other aspects of the present disclosure will become apparent from the following description of embodiments with reference to the accompanying drawings in which:

FIGS. 5A to 5I are a joint timing chart illustrating the output routine and determination routine when no anomaly has occurred in a low-voltage power source;

FIGS. 6A to 6I are a joint timing chart illustrating the output routine and determination routine when an anomaly has occurred in the low-voltage power source;

FIGS. 13A to 13J are a joint timing chart illustrating the output routine and determination routine when an output anomaly has occurred in the controller according to the third embodiment.

DETAILED DESCRIPTION OF EMBODIMENTS

First Embodiment

The following describes a control apparatus for an inverter, which has been applied to a vehicular system 100 according the first embodiment with reference to the accompanying drawings.

Figure 1:
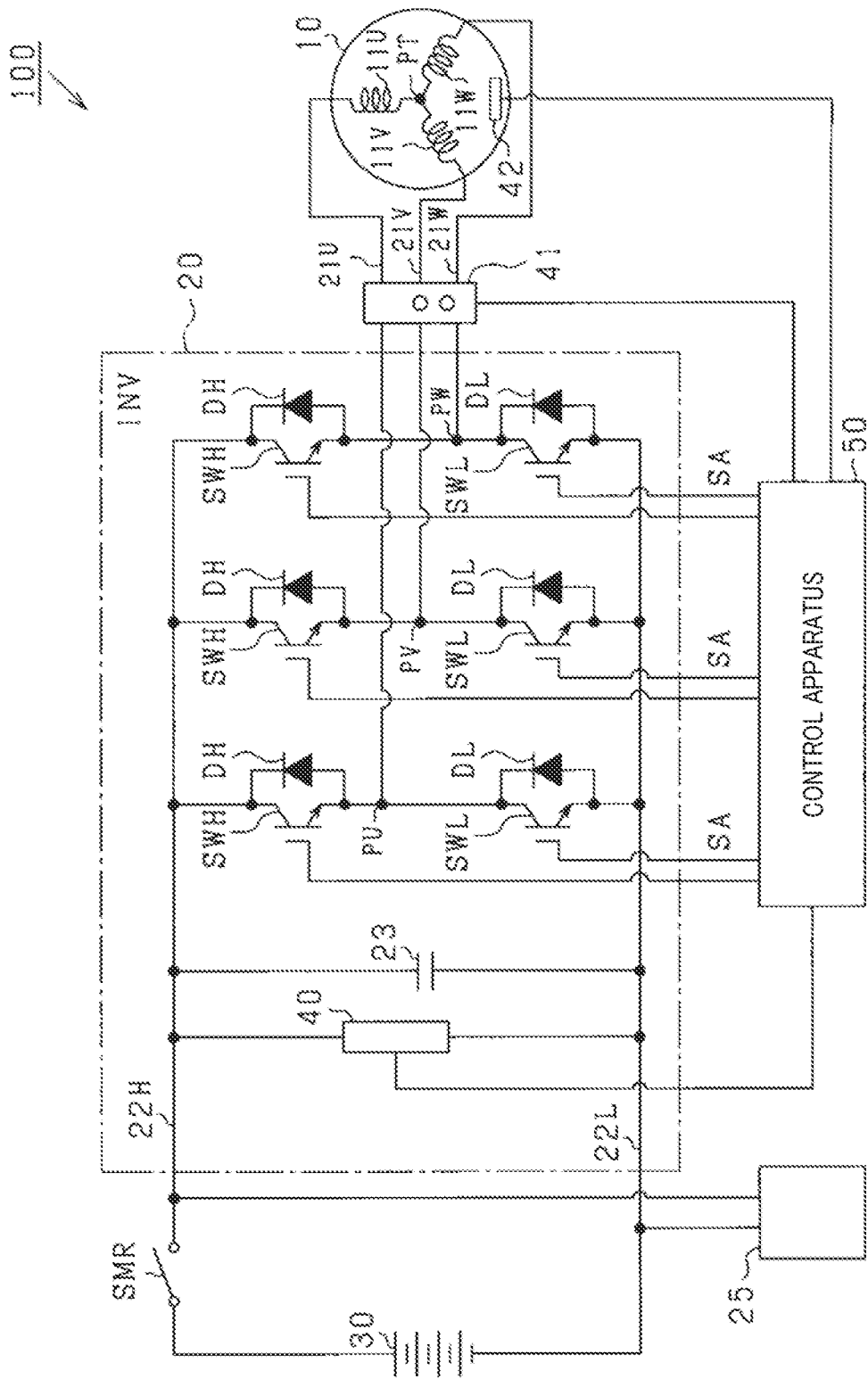
FIG. 1 is an overall structural diagram of a system.

Referring to FIG. 1, the vehicular system 100 includes a rotary electric machine 10 and an inverter 20. The rotary electric machine 10 of the first embodiment is designed as a brushless synchronous machine, more specifically, a brushless permanent-magnet synchronous machine. The rotary electric machine 10 includes three-phase (UVW-phase) windings 11U, 11V, and 11W.

The rotary electric machine 10 is electrically connected to a battery 30 serving as a direct-current (DC) power source via the inverter 20.

The inverter 20 includes three-phase (UVW-phase) series-connected switch members for the respective three-phases of the rotary electric machine 10. The series-connected switch member for each phase is comprised of an upper-arm switch SWH and a lower-arm switch SWL connected in series to each other.

The connection point PU between the upper- and lower-arm switches SWH and SWL for the U-phase is connected to a first end of the U-phase winding 11U through a U-phase conductor 21U. Similarly, the connection point PV between the upper- and lower-arm switches SWH and SWL for the V-phase is connected to a first end of the V-phase winding 11V through a V-phase conductor 21V, and the connection point PW between the upper- and lower-arm switches SWH and SWL for the W-phase is connected to a first end of the W-phase winding 11W through a W-phase conductor 21W. Opposite second ends of the three-phase windings 11U, 11V, and 11W are connected to a common junction, i.e., a neutral point PT.

A cable or busbar can be used for each conductor member 21U, 21V, 21W.

The first embodiment uses, as each of the upper- and lower-arm switches SWH and SWL, a voltage-controlled semiconductor switch, such as an IGBT.

Upper-arm diodes, such as freewheel diodes, DH are connected in antiparallel to the respective upper-arm switches SWH. Similarly, lower-arm diodes, such as freewheel diodes, DL are connected in antiparallel to the respective lower-arm switches SWL.

The collector of each-phase upper-arm switch SWH is connected to the positive terminal of the battery 30 through a high-side electrical path 22H. The emitter of each-phase lower-arm switch SWL is connected to the negative terminal of the battery 30 through a low-side electrical path 22L. The first embodiment uses a secondary battery as the battery 30. The secondary battery as the battery 30 has an output voltage, i.e., a rated voltage, of, for example, 100 volts (V) or above.

The vehicular system 100 includes a control apparatus 50 and a shutoff switch SMR mounted on the high-side electrical path 22H. The shutoff switch SMR is comprised of, for example, a relay switch or a semiconductor switch. The control apparatus 50 can be configured to turn on or off the shutoff switch SMR or a higher-level control apparatus, which is higher in level than the control apparatus 50, can be configured to turn on or off the shutoff switch SMR.

The inverter 20 includes a capacitor 23 located at its input side.

The capacitor 23, which has opposing high- and low-side terminals and serves as a high-voltage power storage, works to smooth an input voltage to the inverter 20. The high-side terminal of the smoothing capacitor 23 is connected to the high-side electrical path 22H, and the low-side terminal of the smoothing capacitor 23 is connected to the low-side electrical path 22L.

The vehicular system 100 includes vehicular electrical devices 25, which include at least one of, for example, a power compressor and a DC-DC converter. The power compressor constitutes an air-conditioning system installed in the vehicle, and is energized by the battery 30 to circulate a refrigerant in a refrigeration cycle of the air-conditioning system. The DC-DC converter is configured to lower the output voltage of the battery 30, and supply a lowered output voltage to low-voltage loads that include a low-voltage power source 26 that serves as a power storage unit or a low-voltage power storage unit (see FIG. 2). The low-voltage power source 26 according to the first embodiment is a secondary battery, such as a lead-acid storage battery, which has an output voltage, i.e., a rated voltage, lower than the output voltage, i.e., the rated voltage, of the battery 30.

For example, the secondary battery has the output voltage, i.e., the rated voltage, of, for example, 12 V.

The vehicular system 100 includes a voltage sensor 40, a current sensor 41, and a rotational angle sensor 42. The voltage sensor 40 is configured to measure a voltage across the capacitor 23, which will also be referred to as a power-supply voltage, and output a measurement signal indicative of the measured voltage across the capacitor 23.

The current sensor 41 is configured to measure, from three-phase currents flowing in the rotary electric machine 10, at least two-phase currents, and output a measurement signal indicative of the measured at least two-phase currents. The rotational angular sensor 42 is comprised of, for example, a resolver or a hall element, and is configured to output a measurement signal indicative of a rotational electric angle of the rotary electric machine 10.

The measurement signals outputted from the respective sensors 40, 41, and 42 are inputted to the control apparatus 50.

The control apparatus 50 is configured to perform, based on the measurement signals, switching control of the switches SWH and SWL of each phase to accordingly adjust a value of a controlled variable of the rotary electric machine 10 to a commanded value, making it possible to perform drive control of the rotary electric machine 10.

Specifically, the control apparatus 50 is configured to output, to the gate of each of the upper- and lower-arm switches SWH and SWL of each phase, a drive signal SA to accordingly turn on the upper- and lower-arm switches SWH and SWL of each phase alternately while ensuring a dead-time TD (see FIG. 5) between an on state of the upper-arm switch SWH and that of the lower-arm switch SWL. The control apparatus 50 can be comprised of a semiconductor integrated circuit (IC).

Figure 2:
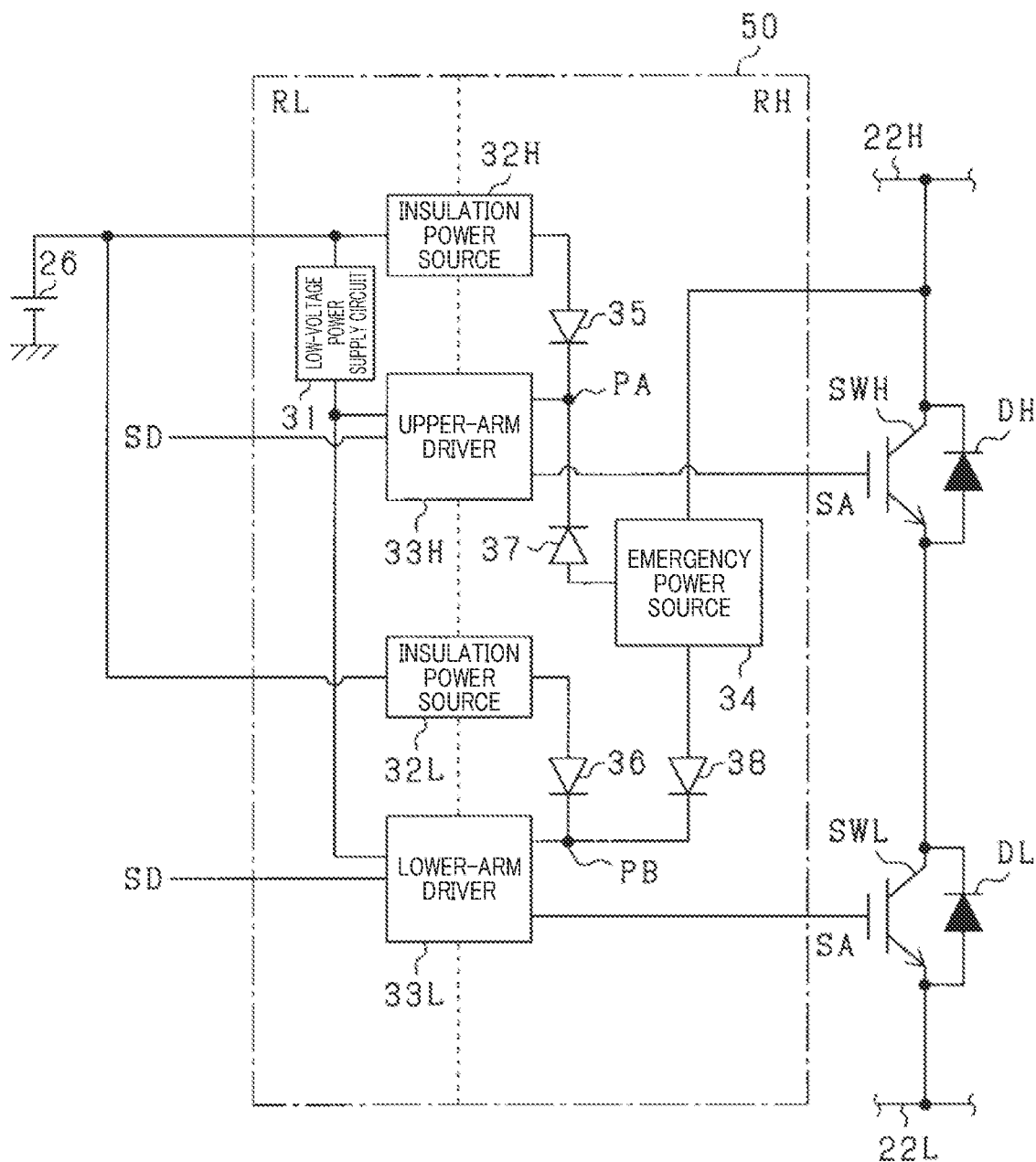
FIG. 2 is a circuit block diagram illustrating a configuration of a control apparatus according to the first embodiment.

Next, the following describes a configuration of the control apparatus 50 using FIG. 2.

FIG. 2 illustrates a first part of the configuration of the control apparatus 50, which corresponds to the U-phase winding 11U. Because a second part of the configuration of the control apparatus 50, which corresponds to the V-phase winding 11V and a third part of the configuration of the control apparatus 50, which corresponds to the W-phase winding 11W, are substantially identical to the first part of the configuration of the control apparatus 50, duplicated descriptions of the second and third parts of the configuration of the control apparatus 50 are omitted.

The control apparatus 50 includes a low-voltage power supply circuit 31, an upper-arm insulation power source 32H, a lower-arm insulation power source 32L, an upper-arm driver 33H, a lower-arm driver 33L, an emergency power source 34, and first to fourth diodes 35 to 38.

The low-voltage power supply circuit 31 is comprised of a switching power supply or a series power supply. The low-voltage power supply circuit 31 has a high-voltage terminal and a low-voltage terminal. The low-voltage power source 26 has a positive terminal and a negative terminal. The high-voltage terminal of the low-voltage power supply circuit 31 is connected to the positive terminal of the low-voltage power source 26, and the low-voltage terminal of the low-voltage power supply circuit 31 is connected to the upper- and lower-arm drivers 33H and 33L. The low-voltage power supply circuit 31 is configured to lower the output voltage of the low-voltage power source 26 to accordingly output a lowered voltage to each of the upper- and lower-arm drivers 33H and 33L.

The upper-arm insulation power source 32H has a high-side terminal and a low-side terminal. The high-side terminal of the upper-arm insulation power source 32H is connected to the positive terminal of the low-voltage power source 26. The low-side terminal of the upper-arm insulation power source 32H is connected to the anode of the first diode 35. The cathode of the first diode 35 is connected to the upper-arm driver 33H. The upper-arm insulation power source 32H is configured to generate, based on the output voltage of the low-voltage power source 26, a drive voltage to be supplied to the upper-arm driver 33H, and output, to the upper-arm driver 33H, the generated drive voltage through the first diode 35.

The lower-arm insulation power source 32L has a high-side terminal and a low-side terminal. The high-side terminal of the lower-arm insulation power source 32L is connected to the positive terminal of the low-voltage power source 26. The low-side terminal of the lower-arm insulation power source 32L is connected to the anode of the second diode 36. The cathode of the second diode 36 is connected to the lower-arm driver 33L. The lower-arm insulation power source 32L is configured to generate, based on the output voltage of the low-voltage power source 26, a drive voltage to be supplied to the lower-arm driver 33L, and output, to the lower-arm driver 33L, the generated drive voltage through the second diode 36.

The control apparatus 50 includes a high-voltage region RH and a low-voltage region RL. The upper- and lower-arm insulation power sources 32H and 32L are installed in both the low- and high-voltage regions 32L and 32H while straddling the boundary between the low- and high-voltage regions 32L and 32H. The low-voltage region RL serves as a region, one or more components in which can receive power supplied from the lower-arm insulation power source 32L. The high-voltage region RH serves as a region, one or more components in which can receive power supplied from the upper-arm insulation power source 32H. The low-voltage region RL and the high-voltage region RH are electrically isolated from each other in the control apparatus 50. The low-voltage power source 26 is installed in the low-voltage region RL, and the smoothing capacitor 23 is installed in the high-voltage region RH.

The emergency power source 34 is installed in the high-voltage region RH, and the terminal voltage across the smoothing capacitor 23 is supplied to the emergency power source 34 through the high-side electrical path 22H. The emergency power source 34 is configured to generate, based on the terminal voltage across the smoothing capacitor 23, an anomaly drive voltage to be supplied to the upper- and lower-arm drivers 33H and 33L.

Specifically, the emergency power source 34 is connected to the anode of each of the third and fourth diodes 37 and 38. The cathode of the third diode 37 is connected to any point PA on a connection line between the cathode of the first diode 35 and the upper-arm driver 33H. The cathode of the fourth diode 38 is connected to any point PB on a connection line between the cathode of the second diode 36 and the lower-arm driver 33L.

The anomaly drive voltage outputted from the emergency power source 34 according to the first embodiment is designed to be lower than the drive voltage individually outputted from each of the upper- and lower-arm insulation power sources 32H and 32L.

This design enables the third diode 37 to restrict the supply of power from the emergency power source 34 to the upper-arm driver 33H if an insulation anomaly related to the upper-arm driver 33H has occurred. The insulation anomaly related to the upper-arm driver 33H represents a power supply anomaly from the upper-arm insulation power source 32H, which results in power supply from the upper-arm insulation power source 32H being disabled.

Similarly, this design enables the fourth diode 38 to restrict the supply of power from the emergency power source 34 to the lower-arm driver 33L if an insulation anomaly related to the lower-arm insulation power source 32L has not occurred. The insulation anomaly related to the lower-arm insulation power source 32L represents a power supply anomaly from the lower-arm insulation power source 32L, which results in power supply from the lower-arm insulation power source 32L being disabled.

The insulation anomaly related to the upper-arm insulation power source 32H may be, for example, a failure of the upper-arm insulation power source 32H, or a break in a power supply path between the upper-arm insulation power source 32H and the upper-arm driver 33H. Similarly, the insulation anomaly related to the lower-arm driver 33L may be, for example, a failure of the lower-arm insulation power source 32L, or a break in a power supply path between the lower-arm insulation power source 32L and the lower-arm driver 33L.

In contrast, if the insulation anomaly related to the upper-arm driver 33H has occurred, the emergency power source 34 supplies power, i.e., the anomaly drive voltage, to the high-voltage region RH. Similarly, if the insulation anomaly related to the lower-arm driver 33L has occurred, the emergency power source 34 supplies power, i.e., the anomaly drive voltage, to the high-voltage region RH.

The upper-arm drivers 33H are provided individually for the respective upper-arm switches SWH, and similarly the lower-arm drivers 33L are provided individually for the respective lower-arm switches SWL. Each of the upper- and lower-arm drivers 33H and 33L is configured to output, based on a drive instruction SD inputted thereto from the higher-level control apparatus, a drive signal SA to the corresponding one of the upper- and lower-arm switches SWH and SWL. The drive instruction SD can be switched between an on instruction and an off instruction.

Specifically, each of the upper- and lower-arm drivers 33H and 33L is configured to output, based on the on instruction inputted thereto from the higher-level control apparatus as the drive instruction SD, the drive signal SA to the corresponding one of the upper- and lower-arm switches SWH and SWL to accordingly turn on the corresponding one of the upper- and lower-arm switches SWH and SWL.

Similarly, each of the upper- and lower-arm drivers 33H and 33L is configured to output, based on the off instruction inputted thereto from the higher-level control apparatus as the of the drive instruction SD, the drive signal SA to the corresponding one of the upper- and lower-arm switches SWH and SWL to accordingly turn off the corresponding one of the upper- and lower-arm switches SWH and SWL.

Figure 3:
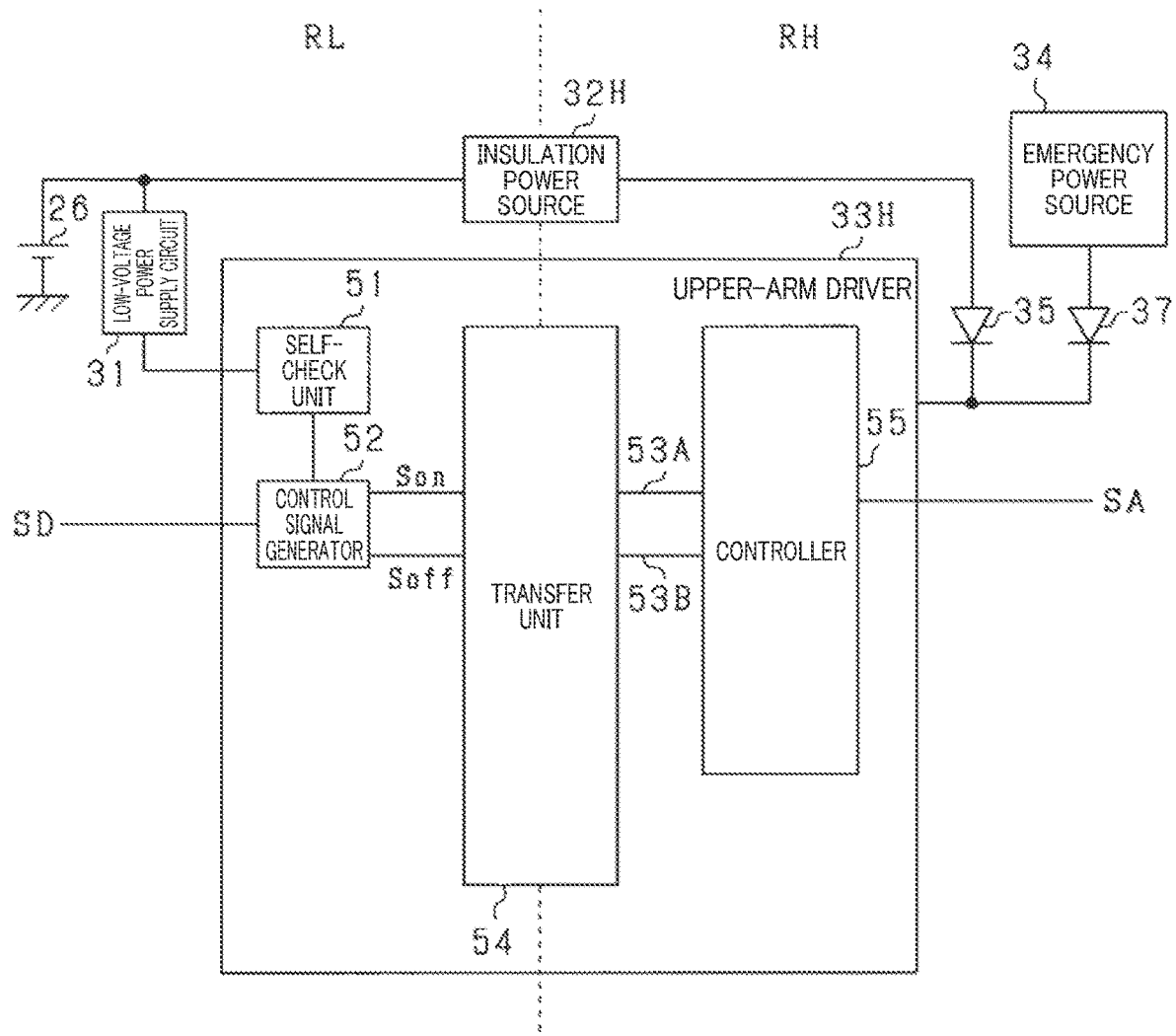
FIG. 3 is a circuit block diagram illustrating a configuration of an upper-arm driver.

The following describes a configuration of the upper-arm driver 33H using FIG. 3. Because a configuration of the lower-arm driver 33L is substantially identical to the configuration of the upper-arm driver 33H, duplicated descriptions of the configuration of the lower-arm driver 33L are omitted.

The upper-arm driver 33H provided for each upper-arm switch SWH includes a self-check unit 51, a control signal generator 52, an on-signal transfer path 53A, an off-signal transfer path 53B, a transfer unit 54, and a controller 55.

The self-check unit 51 is installed in the low-voltage region RL, and is configured to perform a self-checking task of checking whether a low-voltage anomaly has occurred. The low-voltage anomaly represents a power-supply anomaly from the low-voltage power source 26, which results in power supply from the low-voltage power source 26 being disabled. The low-voltage anomaly related to the low-voltage power source 26 may be, for example, a failure of the low-voltage power source 26, or a break in a power supply path between the low-voltage power source 26 and the low-voltage power supply circuit 31, or a failure of the low-voltage power supply circuit 31.

Specifically, the self-check unit 51 is configured to determine whether an output voltage of the low-voltage power supply circuit 31 is within a predetermined voltage range, check that no low-voltage anomaly has occurred upon determination that the output voltage of the low-voltage power supply circuit 31 is within the predetermined voltage range, and check that the low-voltage anomaly has occurred upon determination that the output voltage of the low-voltage power supply circuit 31 is outside the predetermined voltage range.

The control signal generator 52 is installed in the low-voltage region RL, and configured to generate, based on the drive instruction SD for the corresponding upper-arm switch SWH, an on-signal Son or an off-signal Soff as a control signal.

For example, the first embodiment uses, as the on-signal Son, a pulse signal comprised of continuous pulses; the number of continuous pulses will be referred to as NA that is an integer more than or equal to 2. The control signal generator 52 generates the on-signal Son, which is comprised of continuous pulses, in response to change of the drive instruction SD from the off instruction to the on instruction, and outputs the on-signal Son to the on-signal transfer path 53A.

For example, the first embodiment uses, as the off-signal Soff, a pulse signal comprised of continuous pulses; the number of continuous pulses will be referred to as NB that is an integer more than or equal to 2. The control signal generator 52 generates the off-signal Soff, which is comprised of continuous pulses, in response to change of the drive instruction SD from the on instruction to the off instruction, and outputs the off-signal Soff to the off-signal transfer path 53B.

That is, the on-signal Son represents the on instruction of the drive instruction SD, and the off-signal Soff represents the off instruction of the drive instruction SD.

The transfer unit 54 is installed in both the low- and high-voltage regions 32L and 32H while straddling the boundary between the low- and high-voltage regions 32L and 32H. Specifically, the transfer unit 54 is located on the on-signal transfer path 53A and the off-signal transfer path 53B, and is configured to transfer one of the on-signal Son and the off-signal Soff outputted from the control signal generator 52 to the controller 55 while electrically isolating between the low- and high-voltage regions 32L and 32H. The transfer unit 54 of first embodiment can be comprised of, for example, a magnetic coupler.

The controller 55 is installed in the high-voltage region RH. The controller 55 is configured to generate, based on the on-signal Son or the off-signal Soff transferred through the transfer unit 54, the drive signal SA, and output, to the corresponding upper-arm switch SWH, the drive signal SA to accordingly perform on-off switching control of the corresponding upper-arm switch SWH.

Specifically, the controller 55 is configured to output, as the drive signal SA, a predetermined on-voltage to the gate of the corresponding upper-arm switch SWH for the period from the input of the on-signal Son to the input of the off-signal Soff. This causes a gate voltage of the corresponding upper-arm switch SWH to become more than or equal to a predetermined threshold voltage Vth, resulting in the corresponding upper-arm switch SWH being in the on state.

In contrast, the controller 55 is configured to output, as the drive signal SA, a predetermined off-voltage to the gate of the corresponding upper-arm switch SWH for the period from the input of the off-signal Soff to the input of the on-signal Son. This causes the gate voltage of the corresponding upper-arm switch SWH to become less than the predetermined threshold voltage Vth, resulting in the corresponding upper-arm switch SWH being in the off state.

To the controller 55, as illustrated in FIG. 1, the measurement signal outputted from the voltage sensor 40, which represents the measured voltage across the capacitor 23, is inputted. Similarly, as illustrated in FIG. 1, the measurement signal outputted from the current sensor 41, which represents the measured at least two-phase currents, is inputted. Additionally, as illustrated in FIG. 1, the measurement signal outputted from the rotational angular sensor 42, which represents the rotational electric angle of the rotary electric machine 10, is inputted. The rotational electric angle of the rotary electric machine 10 will be referred to as a rotational electric angle θe hereinafter.

The controller 55 is configured to calculate, based on the rotational electric angle θe, an electric angular frequency ωe of the rotational electric machine 10.

The controller 55 is configured to determine whether an anomaly has occurred in the rotary electric machine 10 in accordance with the voltage across the capacitor 23, the at least two-phase currents, and the rotational electric angle θe (electric angular frequency ωe) inputted thereto.

Additionally, the controller 55 is configured to perform a three-phase active short-circuit (ASC) control task, which will be referred to as an ASC control task, upon determining that an anomaly has occurred in the rotary electric machine 10. The ASC control task is a task to turn on one of all the upper-arm switches SWH and all the lower-arm switches SWL and turn off the other of all the upper-arm switches SWH and all the lower-arm switches SWL. For example, the controller 55 of the first embodiment is configured to perform the ASC control task to thereby turn on all the lower-arm switches SWL and turn off the all the upper-arm switches SWH.

Execution of the ASC control task prevents the voltage across the capacitor 23 from excessively increasing due to a voltage induced in each winding 11U, 11V, and 11W.

The controller 55 is configured to perform the ASC control task upon not only determining that an anomaly has occurred in the rotary electric machine 10 but also determining that the low-voltage anomaly has occurred. For this reason, the control apparatus 50 is required to have a function, such as a watchdog function, of transferring, to the controller 55, information indicative of the occurrence of the low-voltage anomaly. In order to reliably transfer the occurrence of the low-voltage anomaly to the controller 55, an additional transfer means dedicated for transfer of the occurrence of the low-voltage anomaly to the controller 55 may be provided in the control apparatus 50. This however may result in the configuration of the control apparatus 50 becoming complicated.

From this viewpoint, the transfer unit 54 of the first embodiment serves as means for transferring, to the controller 55, information representing that no low-voltage anomaly has occurred.

Specifically, the control signal generator 52, which is connected to the self-check unit 51, is configured to perform an output routine of (i) generating a status signal St as a distinct signal in response to determination that no low-voltage anomaly has occurred, and (ii) outputting, to the transfer unit 54, the status signal St. The status signal St is a pulse signal comprised of pulses, the number of which is set to be distinct from the number NA of pulses of the on-signal Son and the number NB of pulses of the off-signal Soff. For example, the number of pulses of the status signal St is set to be smaller than the number NA of pulses of the on-signal Son and the number NB of pulses of the off-signal Soff. For example, the status signal St of the first embodiment is comprised of a single pulse.

The transfer unit 54 is configured to transfer, to the controller 55, the status signal St, so that the status signal St is inputtable to the controller 55. This enables the controller 55 to perform a determination routine of determining, based on information on the status signal St, whether the low-voltage anomaly has occurred.

Figure 4:
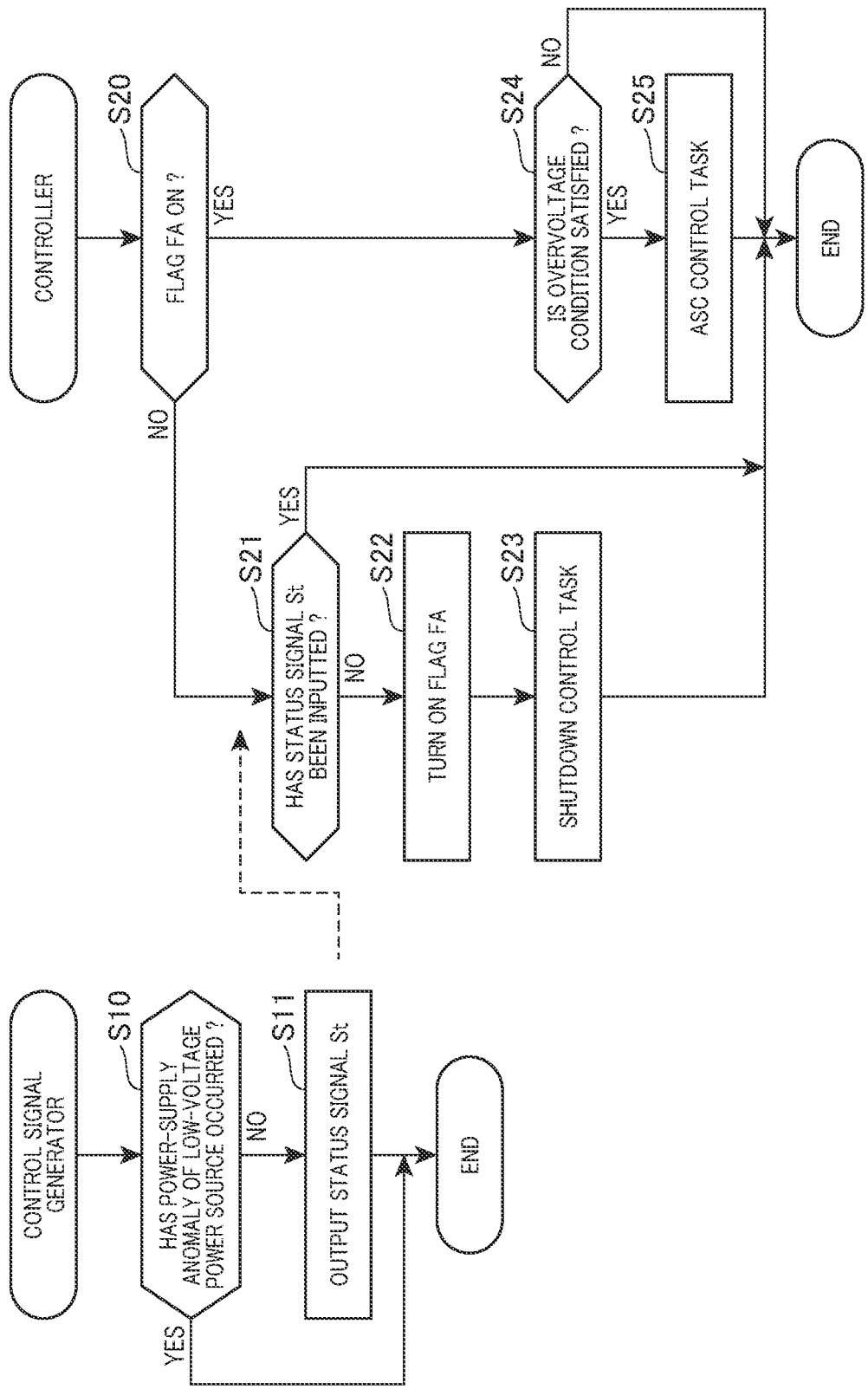
FIG. 4 is a flowchart illustrating an output routine and a determination routine according to the first embodiment.

Next, the following describes, using FIG. 4, the output routine and the determination routine, which are carried out by each of the three-phase upper- and lower-arm drivers 33H and 33L.

First, the following describes the output routine.

The control signal generator 52 of each of the upper- and lower-arm drivers 33H, 33L determines whether a low-voltage anomaly has occurred in step S10. Specifically, the control signal generator 52 of each driver 33H, 33L determines whether a low-voltage anomaly has occurred based on a self-check result of the self-check unit 51 in step S10.

The output routine proceeds to step S11 upon determination that no low-voltage anomaly has occurred (NO in step S10).

In step S11, the control signal generator 52 of each driver 33H, 33L generates the status signal St, and outputs the status signal St to the transfer unit 54, and thereafter terminates the output routine. Specifically, in step S11, the control signal generator 52 of each driver 33H, 33L outputs the status signal St to the transfer unit 54 after a predetermined period TK has elapsed since completion of outputting each of the on-signal Son and the off-signal Soff.

In contrast, the control signal generator 52 of each driver 33H, 33L terminates the output routine upon determination that the low-voltage anomaly has occurred (YES in step S10).

Note that the control signal generator 52 of each driver 33H, 33L according to the first embodiment serves as a distinct-signal generator to perform the operations in steps S10 and S11.

Next, the following describes the determination routine.

The controller 55 of each driver 33H, 33L determines whether a low-voltage anomaly determination flag FA has been on in step S20. The controller 55 of each driver 33H, 33L turns on the low-voltage anomaly determination flag FA in response to determination that the low-voltage anomaly has occurred, and turns off the low-voltage anomaly determination flag FA in response to determination that no low-voltage anomaly has occurred. The determination routine proceeds to step S21 upon determination that the low-voltage anomaly determination flag FA has been off (NO in step S20). Otherwise, the determination routine proceeds to step S24 upon determination that the low-voltage anomaly determination flag FA has been on (YES in step S20).

In step S21, the controller 55 of each driver 33H, 33L determines whether at least one signal inputted from the transfer unit 54 to the controller 55 includes the status signal St. The controller 55 of each driver 33H, 33L terminates the determination routine upon determining that the at least one signal inputted from the transfer unit 54 to the controller 55 includes the status signal St (YES in step S21).

Otherwise, the controller 55 of each driver 33H, 33L determines that the low-voltage anomaly has occurred upon determining that the at least one signal inputted from the transfer unit 54 to the controller 55 does not include the status signal St (NO in step S21), turning on the low-voltage anomaly determination flag FA in step S22.

Note that the controller 55 of each driver 33H, 33L according to the first embodiment serves as an anomaly determiner or a first anomaly determiner to perform the operation in step S21.

Following the operation in step S21, the controller 55 of each driver 33H, 33L performs a shutdown control task for the corresponding switch SWH, SWL in step S22, and thereafter terminates the determination routine. The shutdown control task carried out by each upper- and lower-arm driver 33H, 33L makes it possible to turn off all-phase upper- and lower-arm switches SWH and SWL.

Following the affirmative determination in step S20, the controller 55 of each driver 33H, 33L determines whether predetermined one or more overvoltage conditions have been satisfied in step S24. The one or more overvoltage conditions include one or more conditions for determination of whether there is a situation where the voltage across the capacitor 23 can increase excessively. The one or more overvoltage conditions can include, for example, a condition that the angular frequency ωe is higher than a predetermined frequency threshold ωt1, and a condition that the voltage across the capacitor 23 measured by the voltage sensor 40 is higher than a predetermined allowable upper-limit voltage of the capacitor 23.

In response to determining that the predetermined one or more overvoltage conditions have been satisfied (YES in step S24), the controller 55 of each driver 33H, 33L switches the shutdown control task to the ASC control task, thus performing the ASC control task in step S25, and thereafter, terminates the determination routine.

Specifically, the controller 55 of each driver 33H, 33L according to the first embodiment is configured to perform the ASC control task only determining that the low-voltage anomaly has occurred. More specifically, the controller 55 of each driver 33H, 33L according to the first embodiment is configured to, upon determination that the low-voltage anomaly has occurred, perform the shutdown control task first, and thereafter perform the ASC control task.

The above configuration makes it possible to prevent
(I) The occurrence of a short-circuit between upper- and lower-arm pair due to the low-voltage anomaly
(II) The failure of at least one of the capacitor 23 and the vehicular electrical devices 25 due to an overvoltage across the capacitor 23

Otherwise, in response to determining that the predetermined one or more overvoltage conditions have not been satisfied (NO in step S24), the controller 55 of each driver 33H, 33L continuously performs the shutdown control task without switching it to the ASC control task, and thereafter, terminates the determination routine.

Next, the following describes an example of how the output routine and the determination routine for each upper- and lower-arm switch SWH, SWL of a selected phase have been carried out with reference to FIGS. 5A to 5I and 6A to 6I.

Each of FIGS. 5A and 6A shows how the low-voltage power source 26 changes between a normal state and an anomaly state over time.

Each of FIGS. 5B and 6B shows how the low-voltage power supply circuit 31 changes between a normal state and an anomaly state over time.

Each of FIGS. 5C and 6C shows how electrical power is supplied from the emergency power source 34 over time.

Each of FIGS. 5D and 6D shows how the drive instruction SD for the upper-arm switch SWH of the selected phase changes over time.

Each of FIGS. 5E and 6E shows how the signal to be transferred through the on-signal transfer path 53A changes over time.

Each of FIGS. 5F and 6F shows how the signal to be transferred through the off-signal transfer path 53B changes over time.

Each of FIGS. 5G and 6G shows how the drive signal SA for the upper-arm switch SWH of the selected phase changes over time.

Each of FIGS. 5H and 6H shows how the drive signal SB for the lower-arm switch SWL of the selected phase changes over time.

Each of FIGS. 5I and 6I shows how the determination result, which represents whether the low-voltage anomaly has occurred, changes over time.

FIGS. 5A to 5I show how the status signals St are outputted through each of the on- and off-signal transfer paths 53A and 53B if no low-voltage anomaly has occurred. FIGS. 5A to 5I show an example where no anomaly has occurred in each of the upper- and lower-arm insulation power sources 32H and 32L, so that power supply from the emergency power source 34 is stopped.

In the example disclosed in FIGS. 5A to 5I, the rotary electric machine 10 is rotatably driven, and the drive instruction SD is switched between the on instruction and the off instruction for each predetermined switching cycle TA. As illustrated in FIG. 5D, the drive instruction SD is changed from the off instruction to the on instruction at time t1, and thereafter is changed from the on instruction to the off instruction at time t4. The drive instruction SD is changed again from the off instruction to the on instruction at time t7 at which one switching cycle TA has elapsed since the time t1. Thereafter, the drive instruction SD is repeatedly changed for each predetermined switching cycle TA.

When the drive instruction SD is changed from the off instruction to the on instruction at the time t1, the on-signal Son is outputted from the transfer unit 54 to the on-signal transfer path 53A. This causes the drive signal SA to be switched from the off voltage to the on voltage, and the on voltage is outputted from the gate of the corresponding upper-arm switch SWH.

Specifically, when the NA-th pulse in the pulses of the on-signal Son rises at time t2, the drive signal SA is changed from the off-voltage to the on-voltage. A period from the start of the on-signal Son to completion of the output of the on-signal Son is defined as an output period of the on-signal Son. Specifically, the output period of the on-signal Son according to the first embodiment is defined as a period from the rising timing of the first pulse in the pulses of the on-signal Son to the falling timing of the NA-th pulse in the pulses of the on-signal Son.

When the predetermined period TK has elapsed since the end of the output period of the on-signal Son at time t3, the status signal St is outputted to the on-signal transfer path 53A. The period of the on instruction of the drive instruction SD will be referred to as an on-instruction period Ton. At that time, during the on-instruction period Ton, the status signal St is outputted for a period other than the output period of the on-signal Son. This prevents the on-signal Son and the status signal St from being superimposed on each other through the on-signal transfer path 53A during each on-instruction period Ton, making it possible to reliably ensure a transmission period of the status signal St through the on-signal transfer path 53A.

When the drive instruction SD is changed from the on instruction to the off instruction at the time t4, the off-signal Soff is outputted from the transfer unit 54 to the off-signal transfer path 53B. This causes the drive signal SA to be switched from the on voltage to the off voltage, and the off voltage is outputted from the gate of the corresponding upper-arm switch SWH.

Specifically, when the NB-th pulse in the pulses of the off-signal Soff rises at time t5, the drive signal SA is changed from the on-voltage to the off-voltage. A period from the start of the off-signal Soff to completion of the output of the off-signal Soff is defined as an output period of the off-signal Soff. Specifically, the output period of the off-signal Soff according to the first embodiment is defined as a period from the rising timing of the first pulse in the pulses of the off-signal Soff to the falling timing of the NB-th pulse in the pulses of the off-signal Soff.

When the predetermined period TK has elapsed since the end of the output period of the off-signal Soff at time t6, the status signal St is outputted to the off-signal transfer path 53B. The period of the off instruction of the drive instruction SD will be referred to as an off-instruction period Toff. At that time, during the off-instruction period Toff, the status signal St is outputted for a period other than the output period of the off-signal Soff. This prevents the off-signal Soff and the status signal St from overlapping each other through the on-signal transfer path 53A during each off-instruction period Toff, making it possible to reliably ensure a transmission period of the status signal St through the off-signal transfer path 53B.

The output routine and the determination routine for the upper-arm switch SWH of the selected phase have been described above. Because the output routine and the determination routine for the lower-arm switch SWL of the selected phase are substantially identical to those for the upper-arm switch SWH, descriptions of the output routine and the determination routine for the lower-arm switch SWL of the selected phase are omitted.

Note that, while no low-voltage anomaly has occurred, the drive signal SA for the upper-arm switch SWH of each phase, and the drive signal SA for the lower-arm switch SWL of the corresponding phase are alternately turned on while the deadtime TD is ensured between the on state of the upper-arm switch SWH and that of the lower-arm switch SWL.

FIGS. 6A to 6I show how the status signals St are outputted through each of the on- and off-signal transfer paths 53A and 53B if a low-voltage anomaly has occurred. FIGS. 6A to 6I show an example where a failure of the low-voltage power source 26 occurs at time t11 which after the time t5 and before the time t6, resulting in no power supply from the low-voltage power source 26 to each of the low-voltage power supply circuit 31, the upper-arm insulation power source 32H, and the lower-arm insulation power source 32L. For this reason, power supply from the emergency power source 34 to each of the upper- and lower-arm drivers 33H and 33L is started at time t11.

The drive instruction SD is fixed to the off instruction in response to the occurrence of the anomaly in the low-voltage power source 26. No power supply from the low-voltage power supply circuit 31 to the control signal generator 52 causes generation and output of each of the on-signal Son, the off-signal Soff, and the status signal St to be stopped.

Specifically, as illustrated in a dashed line in FIG. 6F, output of the status signal St at the time t6 is stopped.

Non-input of the status signal St to the controller 55 enables the controller 55 to determine that a low-voltage anomaly has occurred at the time t6. This determination causes the controller 55 to execute the shutdown control task at the time t6, resulting in the low-voltage determination flag FA being turned on.

In the example illustrated in FIGS. 6A to 6I, the one or more overvoltage conditions have been satisfied in the rotary electric machine 10. This causes the shutdown control task to be switched to the ASC control task at time t12 which after the time t6.

The first embodiment set forth above achieves the following advantageous benefits.

There may be a low-voltage anomaly, such as a failure of the low-voltage power source 26, in the control apparatus 50. At that time, the control apparatus 50 is required to have a function of transferring, to the controller 55, information indicative of the occurrence of the low-voltage anomaly in order to perform the shutdown control task or the ASC control task. An additional transfer means dedicated for transfer of the occurrence of the low-voltage anomaly to the controller 55 may be provided in the control apparatus 50. This however may result in the configuration of the control apparatus 50 becoming complicated.

From this viewpoint, the control apparatus 50 is configured such that the transfer unit 54, which transfers the on-signal Son and the off-signal Soff from the control signal generator 52 to the controller 55, additionally serves to transfer, to the controller 55, information representing that no low-voltage anomaly has occurred.

Specifically, the control apparatus 50 is configured to output, from the low-voltage region RL, the status signal St, which is distinct from the on- and off-signals Son and Soff, to the transfer unit 54 as long as no low-voltage anomaly has occurred. The control apparatus 50 is also configured to determine, in the high-voltage region RH, whether the lower-voltage anomaly has occurred in accordance with the presence or absence of the status signal St.

This configuration enables the transfer unit 54, which transfers the on- and off-signal Son and Soff, to additionally serve to transfer information indicative of whether a low-voltage anomaly has occurred, making it possible for the control apparatus 50 to reliably determine, in the high-voltage region RH, whether a low-voltage anomaly has occurred while preventing the configuration of the control apparatus from becoming complicated.

The status signals St are transferred alternately through the on-signal transfer path 53A and the off-signal transfer path 53B. If, therefore, the status signal St and the on-signal Son are superimposed on each other in the on-signal transfer path 53A, the status signal St may not be reliably transferred. Similarly, if the status signal St and the off-signal Soff are superimposed on each other in the off-signal transfer path 53B, the status signal St may not be reliably transferred.

From this viewpoint, the control apparatus 50 of the first embodiment is configured such that the output period of the on-signal Son is restricted, during the on-instruction period Ton, to a predetermined period from the timing at which the drive instruction SD is switched from the off instruction to the on instruction. Additionally, the control apparatus 50 of the first embodiment is configured such that, during the on-instruction period Ton, the status signal St is outputted for a period other than the output period of the on-signal Son. This prevents the on-signal Son and the status signal St from being superimposed on each other through the on-signal transfer path 53A during each on-instruction period Ton, making it possible to reliably ensure a transmission period of the status signal St through the on-signal transfer path 53A.

The control apparatus 50 of the first embodiment is configured such that the output period of the off-signal Soff is restricted, during the off-instruction period Toff, to a predetermined period from the timing at which the drive instruction SD is switched from the on instruction to the off instruction. Additionally, the control apparatus 50 of the first embodiment is configured such that, during the off-instruction period Toff, the status signal St is outputted for a period other than the output period of the off-signal Soff. This prevents the off-signal Soff and the status signal St from being superimposed on each other through the off-signal transfer path 53B during each off-instruction period Toff, making it possible to reliably ensure a transmission period of the status signal St through the off-signal transfer path 53B.

The signals transferred through the transfer unit 54 include the on-signal Son, the off-signal Soff, and the status signal St. The control apparatus 50 of the first embodiment is configured to determine that a low-voltage anomaly has occurred in response to determination that the status signal St is not inputted to the controller 55. This configuration makes it possible to reliably determine whether a low-voltage anomaly has occurred during a shutdown period of the rotary electric machine 10 in which no on- and off-signals Son and Soff are not inputted to the controller 50.

The number of pulses in each of the on- and off-signal Son and Soff is set to be distinct from the number of pulses in the status signal St according to the first embodiment. This prevents the status signal St from being erroneously recognized as the on-signal Son or the off-signal Soff.

In particular, the number of pulses in the status signal St is set to be smaller than the number of pulses in each of the on- and off-signal Son and Soff according to the first embodiment. Because the on- and off-signals Son and Soff are used to perform on-off switching operations of the upper- and lower-arm switches SWH and SWL, setting the number of pulses in each of the on- and off-signal Son and Soff to be a relatively large value enables on-off switching operations of each of the upper- and lower-arm switches SWH and SWL to be properly controlled.

The relatively large number of pulses in each of the on- and off-signal Son and Soff may make it difficult to ensure the transmission period of the status signal St through the corresponding one of the on- and off-signal transfer paths 53A and 53B. From this viewpoint, the control apparatus 50 of the first embodiment is configured such that the number of pulses in the status signal St is set to be a relatively small value. This reliably ensures the transmission period of the status signal St while enabling on-off switching operations of each of the upper- and lower-arm switches SWH and SWL to be properly controlled.

The control apparatus 50 of the first embodiment is additionally configured to transfer the status signals St through each of the on-signal transfer path 53A and the off-signal transfer path 53B. This configuration enables the transmission period of each status signal St to be more reliably ensured than a case where the status signals St are transferred through a single transfer path.

Each of the low-voltage power supply circuit 31, the upper-arm insulation power source 32H, and the lower-arm insulation power source 32L is configured to be energized by the common low-voltage power source 26. In this configuration, the occurrence of a lower-arm voltage anomaly may cause an anomaly, i.e., an insulation anomaly, to occur in each of the low-voltage power supply circuit 31, the upper-arm insulation power source 32H, and the lower-arm insulation power source 32L. The occurrence of the insulation anomaly makes it difficult for the controller 55 to control on-off switching state of each of the upper- and lower-arm switches SWH and SWL. This may result in the upper- and lower-arm switches SWH and SWL of any phase being short-circuited.

From this viewpoint, the control apparatus 50 of the first embodiment includes the emergency power source 34. This enable, even if there is an anomaly in each of the upper- and lower-arm switches SWH and SWL, the controller 55 to control on-off switching state of each of the upper- and lower-arm switches SWH and SWL based on electrical power supplied from the emergency power source 34, making it possible to prevent the upper- and lower-arm switches SWH and SWL of each phase from being short-circuited.

The control apparatus 50 of the first embodiment is configured to perform the ASC control task upon determining that an anomaly has occurred in the low-voltage power supply circuit 31. This configuration prevents an excessive increase in the voltage induced in each winding 11U, 11V, and 11W, thus preventing a failure in at least one of the capacitor 23 and electrical devices 25 due to an excessive increase in the voltage across the capacitor 23.

Second Embodiment

The following describes the second embodiment with reference to FIGS. 7 to 10. In particular, the following describes mainly different points of the second embodiment as compared with the first embodiment.

The determination routine of the second embodiment differs from the determination routine of the first embodiment in that the determination routine of the second embodiment determines whether there is a switch-drive anomaly in which at least one of the upper- and lower-arm switches SWH and SWL is not able to be driven. The switch-drive anomaly for a switch SWH or SWL may be, for example, an anomaly of the controller 55, which cannot output the drive signal SA to the corresponding switch SWH or SWL, or a break in a drive-signal path connecting between the controller 55 and the corresponding switch SWH or SWL.

Figure 7:
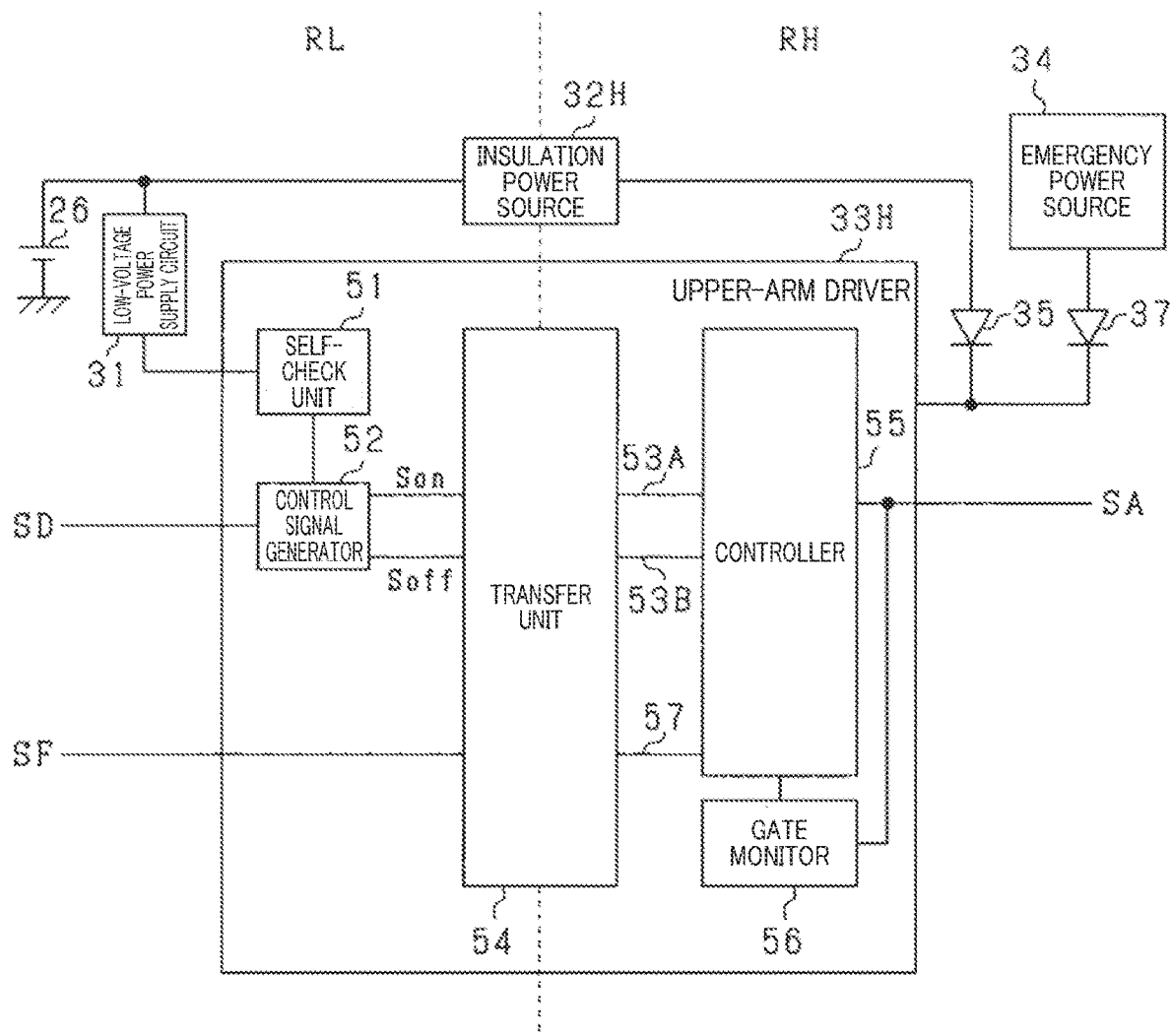
FIG. 7 is a circuit block diagram illustrating a configuration of a control apparatus according to the second embodiment.

FIG. 7 illustrates an upper-arm driver 33H according to the second embodiment. For the sake of convenience, reference characters assigned to respective components of the upper-arm driver 33H of the second embodiment, which are substantially identical to the corresponding components of the upper-arm driver 33H of the first embodiment, are identical to those assigned to the respective corresponding components of the upper-arm driver 33H of the first embodiment. Accordingly, descriptions of the components of the upper-arm driver 33H of the second embodiment are omitted.

The upper-arm driver 33H of the second embodiment includes a gate monitor 56, which is different from that of the first embodiment. The gate monitor 56 is connected to the gate of the corresponding upper-arm switch SWH, and is configured to monitor a voltage to be outputted to the gate of the corresponding upper-arm switch SWH to accordingly detect, based on the monitored voltage, the on/off drive status of the corresponding upper-arm switch SWH.

The controller 55 is connected to the gate monitor 56. The controller 55 is configured to determine, in the determination routine of the second embodiment, whether a switch-drive anomaly has occurred based on the detected on/off drive status of the corresponding upper-arm switch SWH. The controller 55 is configured to generate an anomaly determination signal SF upon determining that a switch-drive anomaly has occurred, and to output the generated anomaly determination signal SF to an anomaly transfer path 57.

The anomaly transfer path 57 is continuously provided on both the high-voltage region RH and the low-voltage region RL through the transfer unit 54. A part of the anomaly transfer path 57 located on the low-voltage region RL is configured to transfer the anomaly determination signal SF based on electrical power supplied from the low-voltage power supply circuit 31. That is, the anomaly determination signal SF is outputted from the controller 55 of the control apparatus 50 to the higher-level control apparatus through the low and high voltage regions RL and RH.

Figure 8:
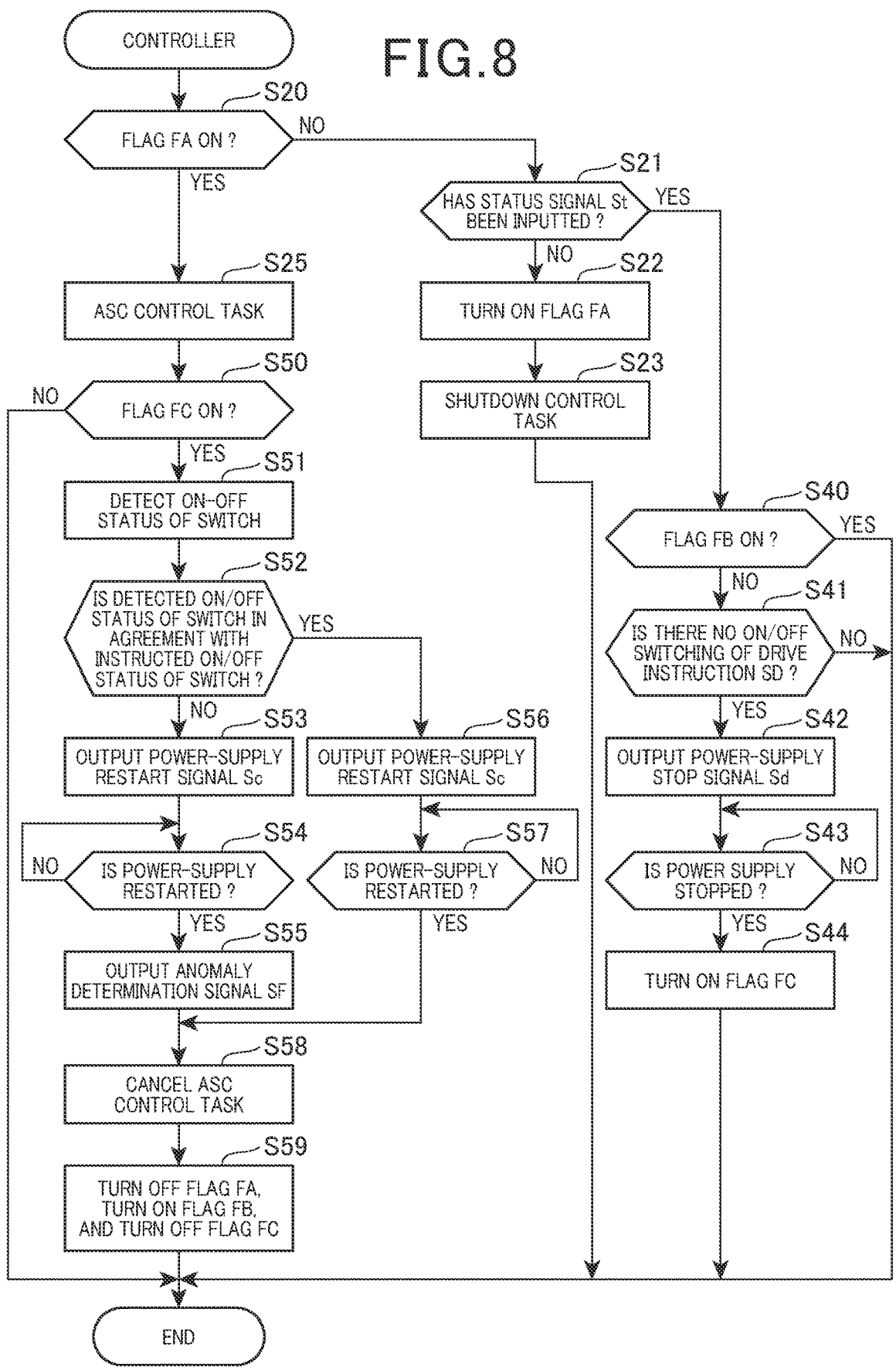
FIG. 8 is a flowchart illustrating a determination routine according to the second embodiment.

Next, the following describes, using FIG. 8, the determination routine carried out by each of the three-phase upper- and lower-arm drivers 33H and 33L according to the second embodiment. Identical step numbers are assigned in FIGS. 4 and 8 to respective identical operations between the determination routines illustrated in respective FIGS. 4 and 8, so that descriptions of the identical operation in FIGS. 4 and 8 are omitted.

Upon determination that the at least one signal inputted from the transfer unit 54 to the controller 55 of each driver 33H, 33L does not include the status signal St (NO in step S21), the controller 55 determines whether a determination execution flag FB is in an on state in step S40 of the determination routine according to the second embodiment. The determination execution flag FB is controlled to be on in response to completion of determination of whether there is a switch-drive anomaly, and to be kept off while determination of whether there is a switch-drive anomaly has not been completed.

Upon determination that the determination execution flag FB is in the on state (YES in step S40), the controller 55 of each driver 33H, 33L terminates the determination routine. Otherwise, upon determination that the determination execution flag FB is in the off state (NO in step S40), the determination routine proceeds to step S41.

The controller 55 of each driver 33H, 33L determines whether there is no switching from one of the on- and off-instructions of the drive instruction SD to the other thereof during a predetermined threshold period in step S41. For example, one switching period TA or two switching periods TA can be set as the predetermined threshold period.

Specifically, the controller 55 of each driver 33H, 33L determines whether the on-signal Son or the off-signal Soff has not been inputted thereto during the predetermined threshold period in step S41.

Upon determination that the on-signal Son or the off-signal Soff has been inputted to the controller 55 during the predetermined threshold period, so that there is a switching from one of the on- and off-instructions of the drive instruction SD to the other thereof during the predetermined threshold period (NO in step S41), the controller 55 of each driver 33H, 33L terminates the determination routine.

Otherwise, upon determination that the on-signal Son or the off-signal Soff has not been inputted to the controller 55 during the predetermined threshold period, so that there is no switching from one of the on- and off-instructions of the drive instruction SD to the other thereof during the predetermined threshold period (YES in step S41), the determination routine proceeds to step S42.

In step S42, the controller 55 of each driver 33H, 33L serves as a stop controller to perform a stop control task of outputting, to the low-voltage power source 31, a power-supply stop signal Sd for starting determination of whether there is a switch-drive anomaly. The power-supply stop signal Sd is to stop power supply from the low-voltage power supply circuit 31 to the components included in the low-voltage region RL, which includes the control signal generator 52. In particular, the controller 55 of each driver 33H, 33L is configured to output the power-supply stop signal Sd upon determining that no low-voltage anomaly has occurred. The power-supply stop signal Sd outputted to the low-voltage power supply circuit 31 causes the low-voltage power supply circuit 31 to stop power supply to the control signal generator 52, resulting in output of the status signal St being stopped.

Next, the controller 55 of each driver 33H, 33L waits until power supply from the low-voltage power supply circuit 31 to the components included in the low-voltage region RL is stopped in response to the outputted power-supply stop signal Sd in step S43.

Figure 9:
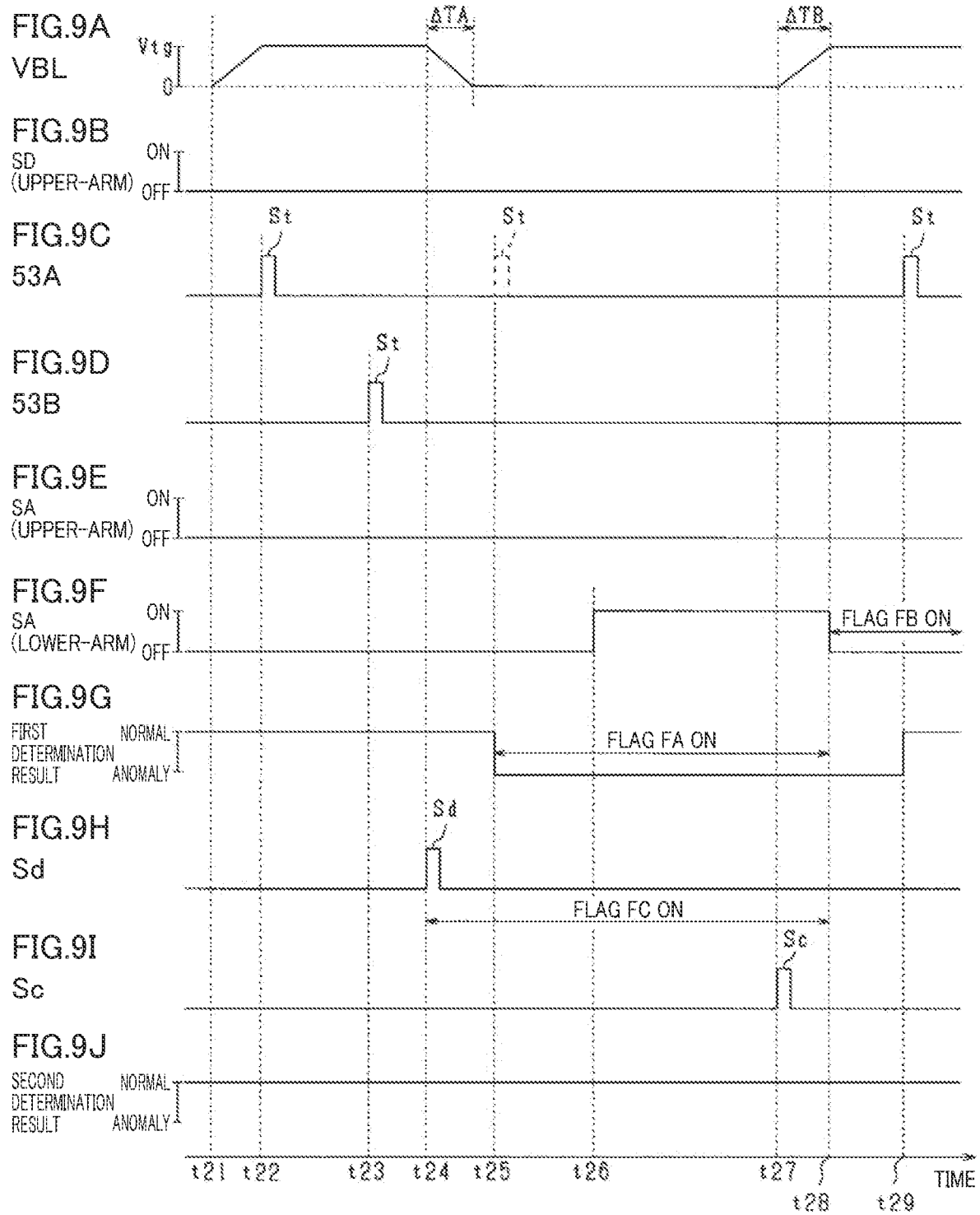
FIGS. 9A to 9J are a joint timing chart illustrating the output routine and determination routine when no output anomaly has occurred in a controller according to the second embodiment.
Figure 10:
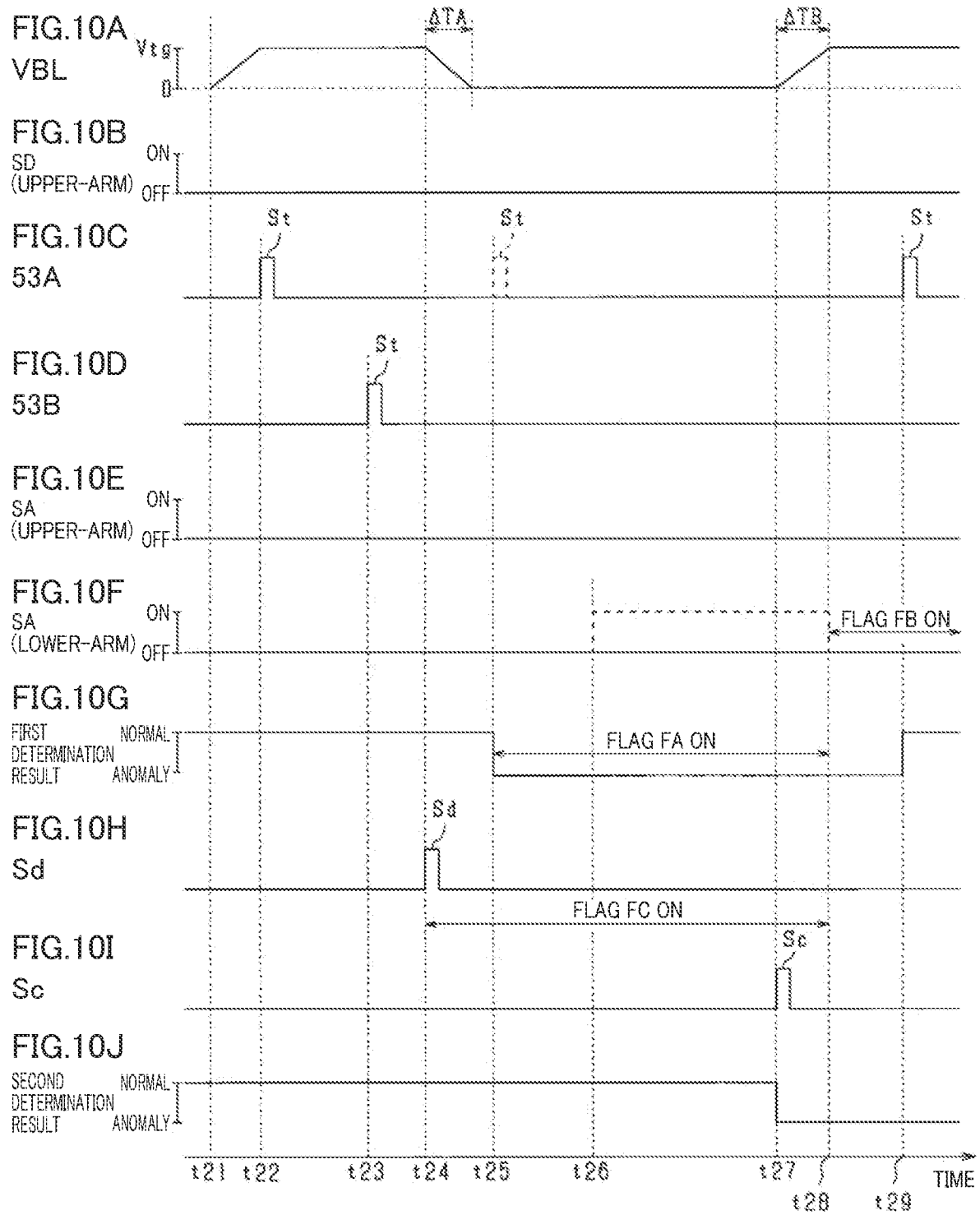
FIGS. 10A to 10J are a joint timing chart illustrating the output routine and determination routine when an output anomaly has occurred in the controller according to the second embodiment.

Specifically, the controller 55 of each driver 33H, 33L determines, as illustrated in FIG. 9, whether a predetermined power-supply stop transition period ΔTA required from the output of the power-supply stop signal Sd to stop of power supply from the low-voltage power supply circuit 31 has elapsed since the output timing of the power-supply stop signal Sd in step S43.

Upon determination that the power-supply stop transition period ΔTA has elapsed since the output timing of the power-supply stop signal Sd (YES in step S43), the determination routine proceeds to step S44.

In step S44, the controller 55 of each driver 33H, 33L turns on an output stop flag FC, and thereafter terminates the determination routine. The output stop flag FC is controlled to be kept on while determination of whether there is a switch-drive anomaly has been carried out, and kept off while determination of whether there is a switch-drive anomaly has not been carried out. In particular, the output stop flag FC is controlled to be turned on as long as no low-voltage anomaly has occurred. The low-voltage determination flag FA is controlled to be turned on in response to turn-on of the output stop flag FC. Specifically, the case where the low-voltage determination flag FA is in the on state includes a first case where a low-voltage anomaly has occurred, and a second case where no low-voltage anomaly has occurred. That is, the on/off state of the output stop flag FC enables whether a low-voltage anomaly has occurred or whether no low-voltage anomaly has occurred to be distinguished.

Upon determination that the low-voltage anomaly determination flag FA has been on (YES in step S20), the determination routine according to the second embodiment proceeds to step S25, and the controller 55 of each driver 33H, 33L switches the shutdown control task to the ASC control task in step S25.

Following the operation in step S25, the controller 55 of each driver 33H, 33L determines whether the output stop flag FC is in the on state in step S50. Upon determination that the output stop flag FC is in the off state, so that a low-voltage anomaly has occurred (NO in step S25), the controller 55 of each driver 33H, 33L terminates the determination routine.

Otherwise, upon determination that the output stop flag FC is in the on state, so that no low-voltage anomaly has occurred (YES in step S25), the determination routine proceeds to step S51.

In step S51, the controller 55 of each driver 33H, 33L serves as a status obtainer to obtain, from the gate monitor 56, the on/off drive status of the corresponding switch SWH, SWL. Next, the controller 55 of each driver 33H, 33L serves as a second anomaly determiner to determine whether an output anomaly thereof has occurred in accordance with the on/off drive status of the corresponding switch SWH, SWL in step S52.

Specifically, the controller 55 of each driver 33H, 33L determines whether the on/off drive status of the corresponding switch SWH, SWL obtained in step S51 is in agreement with an instructed on/off drive status of the corresponding upper- or lower-arm switch SWH, SWL determined based on the on-signal Son or the off-signal Soff in step S52.

Upon determination that the on/off drive status of the corresponding switch SWH, SWL obtained in step S51 is in disagreement with the instructed on/off drive status of the corresponding switch SWH, SWL determined based on the on-signal Son or the off-signal Soff (NO in step S52), the determination routine proceeds to step S53. In step S53, the controller 55 of each driver 33H, 33L outputs, to the low-voltage power supply circuit 31, a power-supply restart signal Sc. The power-supply restart signal Sc instructs the low-voltage power supply circuit 31 to restart power supply to the components included in the low-voltage region RL.

Following the operation in step S54, the controller 55 of each driver 33H, 33L waits until power supply from the low-voltage power supply circuit 31 to the components included in the low-voltage region RL is restarted in response to the outputted power-supply restart signal Sc in step S54.

Specifically, the controller 55 of each driver 33H, 33L determines, as illustrated in FIG. 9, whether a predetermined power-supply restart transition period ΔTB required from the output of the power-supply restart signal Sc to restart of power supply from the low-voltage power supply circuit 31 has elapsed since the output timing of the power-supply restart signal Sc in step S54.

Upon determination that the power-supply restart transition period ΔTB has elapsed since the output timing of the power-supply restart signal Sc (YES in step S54), the determination routine proceeds to step S55. In step S55, the controller 55 of each driver 33H, 33L outputs the anomaly determination signal SF in step S55, and thereafter the determination routine proceeds to step S58.

Otherwise, upon determination that the on/off drive status of the corresponding switch SWH, SWL obtained in step S51 is in agreement with the instructed on/off drive status of the corresponding switch SWH, SWL determined based on the on-signal Son or the off-signal Soff (YES in step S52), the determination routine sequentially proceeds to steps S56 and S57. The operation in each of steps S56 and S57 is identical to the operation in corresponding one of steps S52 and S53. Upon determination that the power-supply restart transition period ΔTB has elapsed since the output timing of the power-supply restart signal Sc (YES in step S57), the determination routine proceeds to step S58. That is, affirmative determination in step S52 results in the determination routine proceeding to step S58 without outputting the anomaly determination signal SF.

In step S58, the controller 55 of each driver 33H, 33L cancels the ASC control task, and thereafter turns off the low-voltage anomaly determination flag FA, turns on the determination execution flag FB, and turns off the output stop flag FC in step S59. After completion of the operation in step S59, the controller 55 of each driver 33H, 33L terminates the determination routine.

Next, the following describes an example of how the output routine and the determination routine for each switch SWH, SWL of a selected phase according to the second embodiment have been carried out with reference to FIGS. 9A to 9J and 10A to 10J.

Each of FIGS. 9A and 10A shows how an output voltage VBL of the low-voltage power supply circuit 31 changes over time.

Each of FIGS. 9B and 10B shows how the drive instruction SD for the upper-arm switch SWH of the selected phase changes over time.

Each of FIGS. 9C and 10C shows how the signal to be transferred through the on-signal transfer path 53A changes over time.

Each of FIGS. 9D and 10D shows how the signal to be transferred through the off-signal transfer path 53B changes over time.

Each of FIGS. 9E and 10E shows how the drive signal SA for the upper-arm switch SWH of the selected phase changes over time.

Each of FIGS. 9F and 10F shows how the drive signal SB for the lower-arm switch SWL of the selected phase changes over time.

Each of FIGS. 9G and 10G shows how the determination result, which will be a first determination result and represents whether the low-voltage anomaly has occurred, changes over time.

Each of FIGS. 9H and 10H shows how the power-supply stop signal Sd changes over time.

Each of FIGS. 9I and 10I shows how the power-supply restart signal Sc changes over time.

Each of FIGS. 9J and 10J shows how the determination result, which will be a second determination result and represents whether the switch-drive anomaly has occurred, changes over time.

FIGS. 9A to 9J show how the status signals St are outputted through each of the on- and off-signal transfer paths 53A and 53B if no switch-drive anomaly has occurred. FIGS. 9A to 9J show an example where determination of whether there is a switch-drive anomaly is carried out upon startup of the vehicular system 100, so that the drive instruction SD is maintained at the off instruction. This therefore results in no on-signal Son and no off-signal Soff being outputted. In the example illustrated in FIGS. 9A to 9J, the drive signal SA for each upper- and lower-arm switch SWH, SWL of the selected phase is not switched in normal times, so that output of the off voltage to the gate of each of the upper- and lower-arm switches SWH and SW is maintained in normal times.

When the vehicular system 100 is started up at time t21, power supply from the low-voltage power source 26 causes the output voltage VBL of the low-voltage power supply circuit 31 to increase up to a reference voltage Vg. This results in electrical power being supplied from the low-voltage power supply circuit 31 to the control signal generator 52. Based on the electrical power supplied from the low-voltage power supply circuit 31, the control signal generator 52 outputs the status signal St. In the example illustrated in FIGS. 9A to 9J, because no on- and off-signals Son and Soff are outputted, the status signal St is outputted alternately to the on- and off-signal transfer paths 53A and 53B every predetermined period.

Specifically, the status signal St is outputted to the on-signal transfer path 53A at time t22, and the status signal St is outputted to the off-signal transfer path 53B at time t23. The output of the status signal St results in determination that no low-voltage anomaly has occurred, so that the power-supply stop signal Sd is outputted at time t24 in order to perform determination of whether there is a switch-drive anomaly, so that the output stop flag FC is turned on. The output of the power-supply stop signal Sd according to the second embodiment results in the output voltage VBL of the low-voltage power supply circuit 31 decreasing down to zero at the time when the power-supply stop transition period ΔTA has elapsed since the time t24. This results in the output of the status signal St from the control signal generator 52 being stopped.

When the output of the status signal St from the control signal generator 52 is stopped in response to the output of the power-supply stop signal Sd, which is illustrated by a dashed line in FIG. 9B, it is determined that a low-voltage anomaly has occurred at time t25. This results in the shutdown control task being carried out at the time t25, so that the low-voltage anomaly determination flag FA is turned on. After the turn-on of the low-voltage anomaly determination flag FA, the shutdown control task is switched to the ASC control task at time t26.

The on/off drive status of each switch SWH, SWL is obtained through the gate monitor 56 at time t27 during the ASC control task, and whether a switch-drive anomaly has occurred in accordance with the obtained on/off drive status of each switch SWH, SWL is carried out. When the determination of whether a switch-drive anomaly has occurred is completed, the power-supply restart signal Sc is outputted.

The output of the restart signal Sc according to the second embodiment results in the output voltage VBL of the low-voltage power supply circuit 31 increasing up to the reference voltage Vtg at the time t28 when the power-supply restart transition period ΔTB has elapsed since the time t27. This results in the output of the status signal St from the control signal generator 52 being stopped. This results in the output of the status signal St from the control signal generator 52 being restarted.

Additionally, the ASC control task is cancelled at the time t28, and the low-voltage anomaly determination flag FA is turned off and the output stop flag FC is turned off at the time t28. This results in the determination of whether there is a switch-drive anomaly being terminated, so that the determination execution flag FB is turned on. Thereafter, when the output of the status signal St is restarted at time t29, it is determined that this time, the low-voltage anomaly does not recur.

FIGS. 10A to 10I show how the status signals St are outputted through each of the on- and off-signal transfer paths 53A and 53B if a switch-drive anomaly has occurred. FIGS. 10A to 10I show an example where a switch-drive anomaly, which causes the controller 55 not to output the drive signal SA properly, has occurred before the startup of the vehicular system 100. This results in, as illustrated by a dashed line in FIG. 10F, even if the shutdown control task is switched to the ASC control task at the time t26, the corresponding lower-arm switch SWL being maintained in the off state.

For this reason, it is determined that the switch-drive anomaly has occurred based on the on/off drive status of the corresponding switch SWH, SWL at the time t27. Thereafter, when the predetermined power-supply restart transition period ΔTB has elapsed since the time t27, the anomaly determination signal SF is outputted at the time t28.

The second embodiment described in detail set forth above achieves the following advantageous benefits.

The control apparatus 50 performs the ASC control task in response to determination that a low-voltage anomaly has occurred. If the control apparatus 50 were configured not to perform the ASC control task properly in response to determination that a switch-drive anomaly has occurred, there would be a short-circuit between the upper- and lower-arm switches SWH and SWL of any phase or an excessive increase in the voltage across the capacitor 23.

It is therefore preferable to generate a situation where the controller 55 performs, by design, the ASC control task before the occurrence of a low-voltage anomaly to accordingly determine whether a switch-drive anomaly has occurred.

From this viewpoint, the control apparatus 50 of the second embodiment is configured to output the power-supply stop signal Sd even if no low-voltage anomaly has occurred to accordingly generate the situation where the controller 55 performs, by design, the ASC control task. Under the situation where the controller 55 performs, by design, the ASC control task, the control apparatus 50 is configured to obtain the on/off drive status of each of the upper- and lower-arm switches SWH and SWL to accordingly determine whether a switch-drive anomaly has occurred.

This configuration therefore makes it possible to determine whether a switch-drive anomaly has occurred before execution of the ASC control task.

The control apparatus 50 of the second embodiment is configured to stop power supply from the low-voltage power supply circuit 31 to the components included in the low-voltage region RL during execution of determination of whether a switch-drive anomaly has occurred. This configuration therefore reduces power consumption during execution of determination of whether a switch-drive anomaly has occurred.

Third Embodiment

Figure 11:
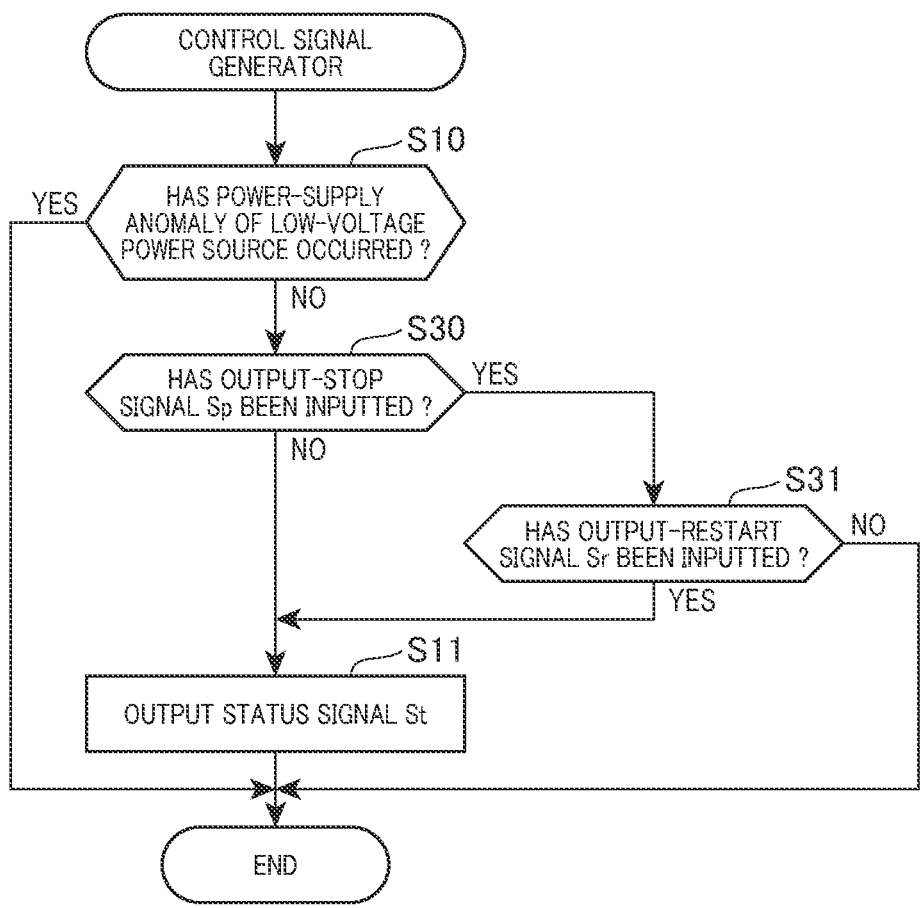
FIG. 11 is a flowchart illustrating an output routine according to the third embodiment.
Figure 12:
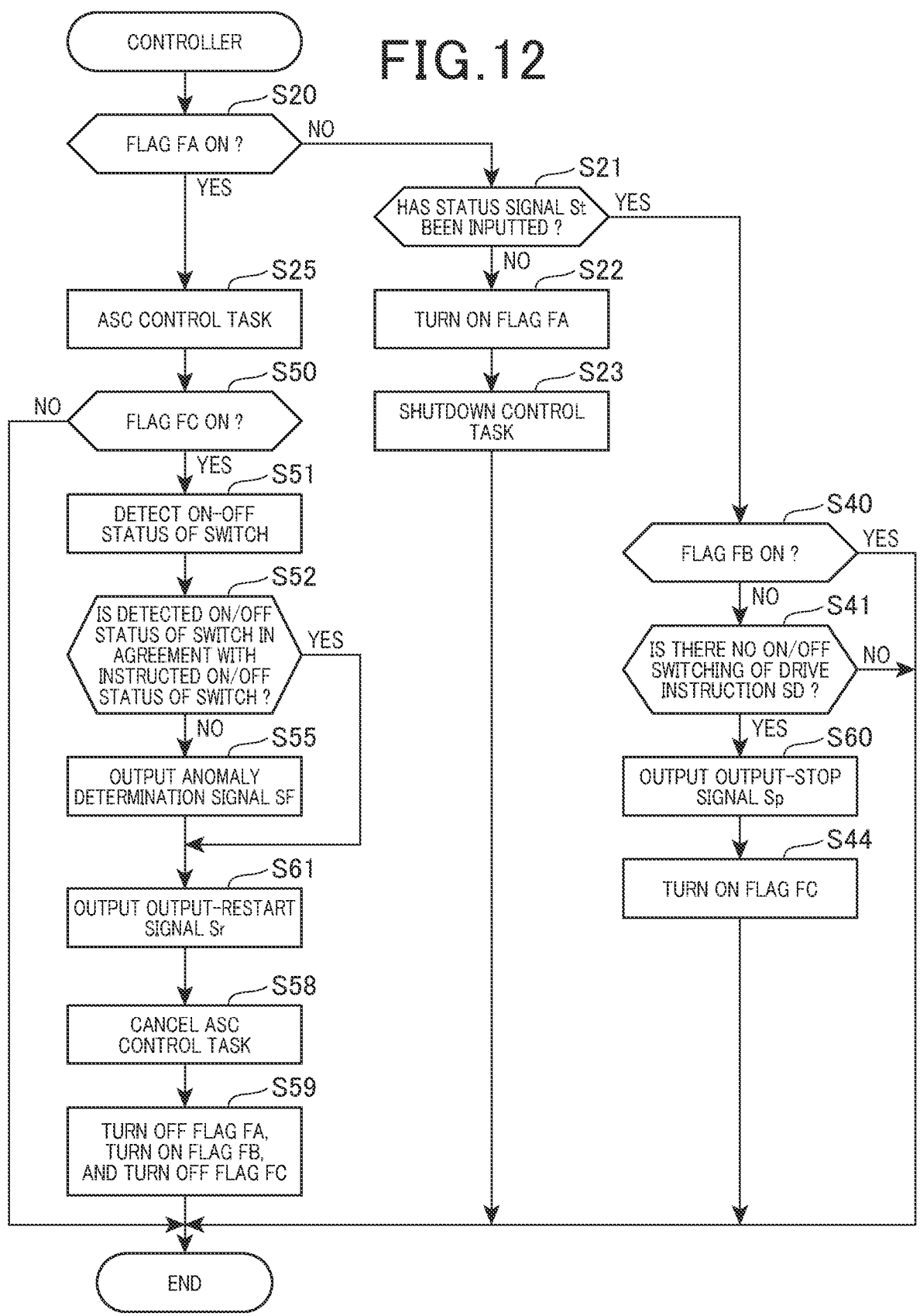
FIG. 12 is a flowchart illustrating a determination routine according to the third embodiment.

The following describes the third embodiment with reference to FIGS. 11 to 13. In particular, the following describes mainly different points of the third embodiment as compared with the second embodiment.

The third embodiment differs from the second embodiment in that power supply from the low-voltage power supply circuit 31 to the components included in the low-voltage region RL is continued during execution of determination of whether a switch-drive anomaly has occurred.

Next, the following describes, using FIG. 11, the output routine carried out by each of the three-phase upper- and lower-arm drivers 33H and 33L according to the third embodiment. Identical step numbers are assigned in FIGS. 4 and 11 to respective identical operations between the output routines illustrated in respective FIGS. 4 and 11, so that descriptions of the identical operation in FIGS. 4 and 11 are omitted.

The output routine of the third embodiment proceeds to step S30 upon determination that no low-voltage anomaly has occurred (NO in step S10).

In step S30, the control signal generator 52 of each driver 33H, 33L determines whether an output stop signal Sp has been inputted thereto. The output stop signal Sp is a signal that instructs the control signal generator 52 to temporarily stop output of the status signal St, and has been inputted from the controller 55 to control signal generator 52 through the transfer unit 54.

Upon determination that no output stop signal Sp has been inputted to the control signal generator 52 (NO in step S30), the output routine proceeds to step S11. Otherwise, upon determination that the output stop signal Sp has been inputted to the control signal generator 52 (YES in step S30), the output routine proceeds to step S31.

In step S31, the control signal generator 52 of each driver 33H, 33L determines whether an output restart signal Sr is inputted thereto. The output restart signal Sr is a signal that instructs the control signal generator 52 to restart output of the status signal St, which has been temporarily stopped by the input of the output stop signal Sp. The output restart signal Sr has been inputted from the controller 55 to control the signal generator 52 through the transfer unit 54.

Upon determination that no output restart signal Sr has been inputted to the control signal generator 52 (NO in step S31), the output routine is terminated. Otherwise, upon determination that the output restart signal Sr has been inputted to the control signal generator 52 (YES in step S31), the output routine proceeds to step S11.

Next, the following describes, using FIG. 12, the determination routine carried out by each of the three-phase upper- and lower-arm drivers 33H and 33L according to the third embodiment. Identical step numbers are assigned in FIGS. 8 and 12 to respective identical operations between the determination routines illustrated in respective FIGS. 8 and 12, so that descriptions of the identical operation in FIGS. 8 and 12 are omitted.

Upon determination that the on-signal Son or the off-signal Soff has not been inputted to the controller 55 during the predetermined threshold period, so that there is no switching from one of the on- and off-instructions of the drive instruction SD to the other thereof during the predetermined threshold period (YES in step S41), the determination routine of the third embodiment proceeds to step S60. In step S60, the controller 55 outputs, to the control signal generator 52, the output stop signal Sp in order to start determination of whether there is a switch-drive anomaly. Thereafter, the determination routine proceeds to step S44.

Upon determination that the on/off drive status of the corresponding switch SWH, SWL obtained in step S51 is in disagreement with the instructed on/off drive status of the corresponding switch SWH, SWL determined based on the on-signal Son or the off-signal Soff (NO in step S52), the determination routine of the third embodiment directly proceeds to step S55 without waiting until the predetermined power-supply restart transition period ΔTB has elapsed. Then, the controller 55 of each driver 33H, 33L outputs the anomaly determination signal SF in step S55, and thereafter the determination routine proceeds to step S61.

In step S61, the controller 55 outputs, to the control signal generator 52, the output restart signal Sr, and thereafter the determination routine proceeds to step S58.

Otherwise, upon determination that the on/off drive status of the corresponding switch SWH, SWL obtained in step S51 is in agreement with the instructed on/off drive status of the corresponding switch SWH, SWL determined based on the on-signal Son or the off-signal Soff (YES in step S52), the determination routine of the third embodiment directly proceeds to step S61 without waiting until the predetermined power-supply restart transition period ΔTB has elapsed.

Next, the following describes an example of how the output routine and the determination routine for each switch SWH, SWL of a selected phase according to the third embodiment have been carried out with reference to FIGS. 13A to 13J. FIG. 13H shows how the output stop signal Sp changes over time, and FIG. 13J shows how the output restart signal Sr changes over time. Because FIGS. 13A to 13G and 13J are identical to FIGS. 9A to 9G and 9J or FIGS. 10A to 10G and 10J, and therefore redundant descriptions related to FIGS. 13A to 13G and 13J are omitted.

FIGS. 13A to 13I show how the status signals St are outputted through each of the on- and off-signal transfer paths 53A and 53B if no switch-drive anomaly has occurred.

As illustrated in FIG. 13A, the power supply from the low-voltage power supply circuit 31 to the control signal generator 52 is continued during execution of determination of whether a switch-drive anomaly has occurred. This results in, when it is determined that a switch-drive anomaly has occurred in accordance with the obtained on/off drive status of each switch SWH, SWL at the time t27, the controller 55 outputs the anomaly determination signal SF at the time t27 without waiting for the lapse of the predetermined power-supply restart transition period ΔTB.

Additionally, the controller 55 of each driver 33H, 33L cancels the ASC control task at the time t27. Additionally, at the time t27, the controller 55 turns off the low-voltage anomaly determination flag FA, and turns off the output stop flag FC. This causes termination of determination of whether a switch-drive anomaly has occurred, resulting in the determination execution flag FB being turned on.

When performing, by design, the ASC control task, power supply from the low-voltage power supply circuit 31 to the components included in the low-voltage region RL can be stopped. In this case, however, the anomaly determination signal SF cannot be outputted until the predetermined power-supply restart transition period ΔTB required from the output of the power-supply restart signal Sc to restart of power supply from the low-voltage power supply circuit 31 has elapsed since the output timing of the power-supply restart signal Sc.

From this viewpoint, the control apparatus 50 of the third embodiment is configured to continue power supply from the low-voltage power supply circuit 31 to the components included in the low-voltage region RL during execution of determination of whether a switch-drive anomaly has occurred. This makes it possible to output the anomaly determination signal SF earlier.

Additionally, the control apparatus 50 of the third embodiment is configured not to output, to the low-voltage power supply circuit 31, a signal to stop power supply from the low-voltage region RL. This therefore results in the control apparatus 50 of the third embodiment having a simpler configuration.

Other Modifications

The above embodiments can be modified as follows:

Each of the above embodiments is configured such that the number of pulses in each of the on- and off-signal Son and Soff is set to be different from the number of pulses in the status signal St in order to prevent the status signal St from being erroneously recognized as the on-signal Son or the off-signal Soff, but the present disclosure is not limited thereto.

Specifically, the width of each pulse in each of the on- and off-signal Son and Soff can be set to be different from the width of each pulse in the status signal St.

The output routine and the determination routine can be carried out for each of the upper- and lower-arm drivers 33H and 33L of at least one phase.

The transfer unit 54 is comprised of a magnetic coupler. As another example, the transfer unit 54 can be comprised of a photocoupler or a capacitive insulator.

As switches constituting the inverter 20, N-channel MOSFETs, each of which includes an intrinsic diode, can be used in place of IGBTs.

The inverter 20 is not limited to a three-phase inverter, and therefore can be designed as a multiphase inverter, such as a two-phase inverter or a four or more-phase inverter. Similarly, the rotary electric machine 10 is not limited to a three-phase rotary electric machine, and therefore can be designed as a multiphase rotary electric machine, such as a two-phase rotary electric machine or a four or more-phase rotary electric machine.

The rotary electric machine 10 is not limited to be applied to a vehicle. Specifically, the rotary electric machine 10 can be applied to a ship or an aircraft.

The control apparatuses and control methods described in the present disclosure can be implemented by a dedicated computer including a memory and a processor programmed to perform one or more functions embodied by one or more computer programs.

The control apparatuses and control methods described in the present disclosure can also be implemented by a dedicated computer including a processor comprised of one or more dedicated hardware logic circuits.

The control apparatuses and control methods described in the present disclosure can further be implemented by at least one dedicated computer comprised of a memory, a processor programmed to perform one or more functions embodied by one or more computer programs, and one or more hardware logic circuits.

The computer programs described in the present disclosure can be stored in a computer-readable non-transitory storage medium as instructions executable by a computer and/or a processor.

While illustrative embodiments of the present disclosure have been described herein, the present disclosure is not limited to the embodiments described herein or disclosed configurations, but includes various modifications and adaptations and/or alternations within the equivalent scope of the descriptions. Additionally, various combinations, embodiments, combinations to which only one element or plural elements have been added, or modified embodiments to which only one element or plural elements have been added are within the category or scope of the present disclosure.

What is claimed is:

1. A control apparatus applicable to a system in which an inverter including a pair of an upper-arm switch and a lower-arm switch and a power storage unit installed in a low-voltage region are provided, the control apparatus comprising:
   a control signal generator provided in the low-voltage region and configured to:
      generate a control signal for switching control of each of the upper- and lower-arm switches; and
      output the control signal;
   a transfer unit installed in both the low-voltage region and a high-voltage region while straddling a boundary between the low- and high-voltage regions, and configured to transfer the control signal outputted from the control signal generator to the high-voltage region, the high-voltage region being electrically isolated from the low-voltage region; and
   a controller installed in the high-voltage region and configured to perform, based on the control signal, switching control of each of the upper- and lower-arm switches, wherein
   the control signal generator installed in the low-voltage region is further configured to:
      generate a distinct signal that is distinct from the control signal as long as no power-supply anomaly from the power storage unit has occurred; and
      output the distinct signal to the transfer unit, and
   the controller is configured such that the distinct signal is inputtable thereto through the transfer unit, the controller being configured to determine whether the power-supply anomaly has occurred in accordance with information on the distinct signal.

2. The control apparatus according to claim 1, wherein:
   the control signal is a pulse signal indicative of an on-instruction or an off-instruction for each of the upper- and lower-arm switches;
   the control signal generator is configured to generate the pulse signal and output the pulse signal when switching one of the on-instruction and the off instruction to the other thereof; and
   the control signal generator is configured to generate, during each predetermined switching cycle, a period other than an output period of the pulse signal indicative of the on-instruction or the off-instruction.

3. The control apparatus according to claim 1, wherein:
   the control signal generator is configured to operate based on electrical power supplied from the power storage unit; and
   the controller is configured to determine that the power-supply anomaly has occurred in response to no input of the distinct signal to the controller.

4. The control apparatus according to claim 1, wherein:
   the power storage unit is a low-voltage power storage; and
   a high-voltage power storage is provided in the system, the high-voltage power storage having an output voltage higher than an output voltage of the low-voltage power storage,
   the control apparatus further comprising:
      an insulation power source installed in both the low-voltage region and a high-voltage region while straddling the boundary between the low- and high-voltage regions, the insulation power source being configured to generate, based on first electrical power that is the electrical power supplied from the low-voltage power storage, second electrical power to be supplied to the controller; and
      an emergency power source configured to generate, based on third electrical power supplied from the high-voltage power storage, fourth electrical power in response to an occurrence of a power supply anomaly of the insulation power source.

5. The control apparatus according to claim 1, wherein:
   a multiphase rotary electric machine equipped with an armature winding for each phase is provided in the system, so that the upper- and lower-arm switches of the inverter are provided for each phase; and
   the controller is configured to perform, when it determines that the power-supply anomaly has occurred, a short-circuit control task that turns on one of (i) all the upper-arm switches and (ii) all the lower-arm switches while turning off the other thereof.

6. The control apparatus according to claim 5, wherein:
   the controller is further configured to:
      obtain a drive status of each of the upper- and lower-arm switches;
      perform, when it is determined by the controller that no power-supply anomaly has occurred, a stop control task of stopping output of the distinct signal; and
      determine, based on the drive status of each of the upper- and lower-arm switches, whether a switch-drive anomaly has occurred, the switch-drive anomaly being at least one of the upper- and lower-arm switches being not able to be driven.

7. The control apparatus according to claim 6, wherein:
the controller is configured to perform the stop control task of causing the control signal generator to stop outputting of the distinct signal while maintaining supply of electrical power from the power storage unit to the control signal generator.

\* \* \* \* \*